United States Patent [19]

Aoshima

[11] Patent Number: 5,563,673
[45] Date of Patent: Oct. 8, 1996

[54] CAMERA

[75] Inventor: Chikara Aoshima, Zama, Japan

[73] Assignee: Canon Kabushiki Kaisha, Tokyo, Japan

[21] Appl. No.: 388,898

[22] Filed: Feb. 14, 1995

Related U.S. Application Data

[63] Continuation of Ser. No. 940,399, Sep. 3, 1992, abandoned.

[30] Foreign Application Priority Data

| Sep. 6, 1991 | [JP] | Japan | 3-254247 |
| Oct. 9, 1991 | [JP] | Japan | 3-289370 |
| Oct. 9, 1991 | [JP] | Japan | 3-289371 |
| Oct. 9, 1991 | [JP] | Japan | 3-289374 |

[51] Int. Cl.$^6$ ................................. G03B 17/26
[52] U.S. Cl. .................. 396/516; 396/207; 396/538
[58] Field of Search ........................ 354/21, 213, 275

[56] References Cited

U.S. PATENT DOCUMENTS

| 1,970,844 | 8/1934 | De La Garde . | |
| 3,096,699 | 7/1963 | Harvey et al. . | |
| 3,543,664 | 12/1970 | Kremp et al. | 354/275 |
| 3,894,700 | 7/1975 | Ito et al. | 354/275 |
| 4,401,379 | 8/1983 | Tamamura et al. . | |
| 4,834,306 | 5/1989 | Robertson et al. | 242/71.1 |
| 4,841,319 | 6/1989 | Hansen | 354/275 |
| 5,115,268 | 5/1992 | Kitagawa et al. | 354/275 |

FOREIGN PATENT DOCUMENTS

| 3-183948 | 6/1991 | Japan . |
| 3-169086 | 6/1991 | Japan . |
| 3-210398 | 7/1991 | Japan . |

*Primary Examiner*—Monroe H. Hayes
*Attorney, Agent, or Firm*—Fitzpatrick, Cella, Harper & Scinto

[57] ABSTRACT

A camera is provided with a cartridge chamber for loading a film cartridge, a cartridge chamber lid for closing or opening said cartridge chamber, and switching means for switching a state of an operation portion formed on a surface of said film cartridge, said switching means interlocking with an operation of said cartridge chamber lid to switch the state of said operation portion of said film cartridge.

6 Claims, 37 Drawing Sheets

CAMERA

This application is a continuation of prior application Ser. No. 07/940,399 filed on Sep. 3, 1992, now abandoned.

BACKGROUND OF THE INVENTION

1. Field of the Invention

The present invention relates to an improvement of a camera using a film cartridge having a cartridge chamber for loading a film cartridge, a cartridge chamber lid for closing/opening the cartridge chamber, and a locking means for switching a supply spool in the film cartridge between a position where rotation of the supply spool is inhibited and a position where rotation of the supply spool is allowed.

2. Related Background Art

A film cartridge having an indicator means for indicating the use state of a film in a film cartridge on a supply spool or a member interlocked therewith and a locking means displaceable between a position where rotation of the supply spool is inhibited and a position where rotation of the supply spool is allowed is already proposed by the present applicant in Japanese Patent Application No. 3-183948 or U.S. Ser. No. 834,640.

This film cartridge uses the same scheme used in a film cartridge of a new scheme proposed in U.S. Pat. No. 4,834,306 to be described below.

This film cartridge comprises a film passing slit, a film which has one end fixed to a supply spool and is wound around the supply spool, a press member, mounted to be coaxial with the supply spool and having a regulation portion for preventing radial spread of an outermost portion of the film, for substantially preventing the outermost portion of the film from being brought into contact with an inner wall of the film cartridge, a release portion for partially deforming the press member and continuously releasing the outermost portion of the film from radial regulation of the press member, and a guide portion for guiding a film portion released from the radial regulation to the film passing slit. The outermost portion of the film is set not to slip on the press member due to the spread of the outermost portion caused by loosening of the film upon rotation of the supply spool in the film feed direction. A driving force is applied in the film feed direction, thereby feeding the film from the film cartridge.

In the film cartridge of this scheme, the film can be fed out from the cartridge upon rotation of the supply spool in the cartridge even after the film is drawn into the film cartridge. Film exposure can be performed up to an intermediate frame, the film can be then rewound into the film cartridge, and the film can be fed again to perform film exposure for the remaining frames.

The film cartridge proposed by the present applicant will be described below. This film cartridge employs this system and will be described in detail below.

Referring to FIGS. 38 to 40, this film cartridge includes an outer cover 1, a film passing slit 1a, an indicator 1b for indicating the number of frames "S" to "36", a supply spool 2, splines 2a1 and 2a2 to be engaged with a camera fork (not shown), and an index portion 2b. The position of the index portion 2b which points a specific position of the indicator 1b indicates the number of frames used or frames unused.

In order to specify the positional relationship between the supply spool 2 and the index portion 2b, the splines 2a1 and 2a2 have different shapes.

The above film cartridge also includes a lock lever 3 mounted in the outer cover 1 to be pivotal about a shaft 3c, as shown in FIG. 40. A film 4 is wound around the supply spool 2, as shown in FIG. 39.

In the film cartridge, press members 5 and 6 are respectively mounted in grooves 2c and 2d of the supply spool 2. One end of a spring 7 is fixed to the outer cover 1, and the other end of the spring 7 is fixed to the lock lever 3. The spring 7 applies a clockwise biasing force to the lock lever 3.

Upon reception of the clockwise biasing force from the spring 7, a ratchet 3b of the lock lever 3 is engaged with one of V-grooves 2e of the supply spool 2, thereby preventing rotation of the spool 2. In a state wherein the film cartridge is not loaded in a camera (not shown), a projection 3a extends from a window 1c formed in the film cartridge, and rotation of the supply spool 2 is inhibited. However, when the film cartridge is loaded in the cartridge chamber of the camera (not shown), the projection 3a of the lock lever 3 is pushed inside the cartridge by the wall of the cartridge chamber. The lock lever 3 is rotated counterclockwise against the biasing force of the spring 7. As a result, the ratchet 3b is disengaged from the corresponding V-groove 2c, and the supply spool 2 is free to rotate. The supply spool 2 is rotated by the fork of the camera (not shown).

The present applicant proposes a camera using this film cartridge (FIGS. 38 to 40) in Japanese Patent Application No. 3-210398. A film exposed halfway is rewound into the film cartridge, and the film is fed again by the fork so that the supply spool is stopped at a position indicating the film use state of the film cartridge, such as a position indicating the number of frames used.

In this prior art, however, during unloading or ejection of the film cartridge from the cartridge chamber after the supply spool 2 is stopped at the position indicating the use state of the film 4 of the film cartridge, since the lock lever 3 is switched to a position where rotation of the supply spool 2 is inhibited, the supply spool 2 is accidentally rotated by an impact caused when a user holds the film cartridge before the lock lever 3 is switched to the rotation inhibition position or by an impact caused when the film cartridge is biased to be ejected or unloaded by an eject member. In this case, a wrong use state is indicated, resulting in inconvenience.

In an alternative camera, the fork engaged with the supply spool 2 to drive the spool 2 is kept engaged with the supply spool 2 at least until the lock lever 3 is switched to the position where rotation of the supply spool 2 is inhibited. When the rotatable fork or fork gear is arranged to be largely movable in the axial direction of the film cartridge, various problems are posed. For example, the overall structure is undesirably complicated or loses compactness. In addition, rotation and driving characteristics are degraded (due to large play of parts).

In a camera proposed by the present applicant in Japanese Patent Application No. 3-169086, a bevel gear is used to rotate a fork, a fork gear, a cartridge chamber lid, a film cartridge, and the like about the bevel gear to open the cartridge chamber lid. In synchronism with the opening operation of the cartridge chamber lid, the fork is retracted to a position not to engage with the supply spool. Upon retraction of the fork, when the film cartridge is rotated together with the cartridge lid about the bevel gear, the supply spool 2 of the film cartridge may be rotated by an impact or vibration.

SUMMARY OF THE INVENTION

According to one aspect of the invention, there is provided a camera using a film cartridge having a locking means capable of being switched between a position where rotation of a supply spool is inhibited and a position where rotation of the supply spool is allowed, comprising a cartridge chamber for loading the film cartridge, a cartridge chamber lid for opening/closing the cartridge chamber, and switching means for switching a state of the locking means in synchronism with an opening/closing operation of the cartridge chamber lid, wherein rotation of the supply spool is inhibited by the locking means upon opening of the cartridge chamber lid, and inhibition of rotation of the supply spool by the locking means is released upon closing of the cartridge chamber lid. Therefore, accidental rotation of the supply spool of the film cartridge can be prevented with a simple structure, and such an application can be achieved in a variety of cartridge chamber structures.

DETAILED DESCRIPTION OF THE PREFERRED EMBODIMENTS

Figure 1:
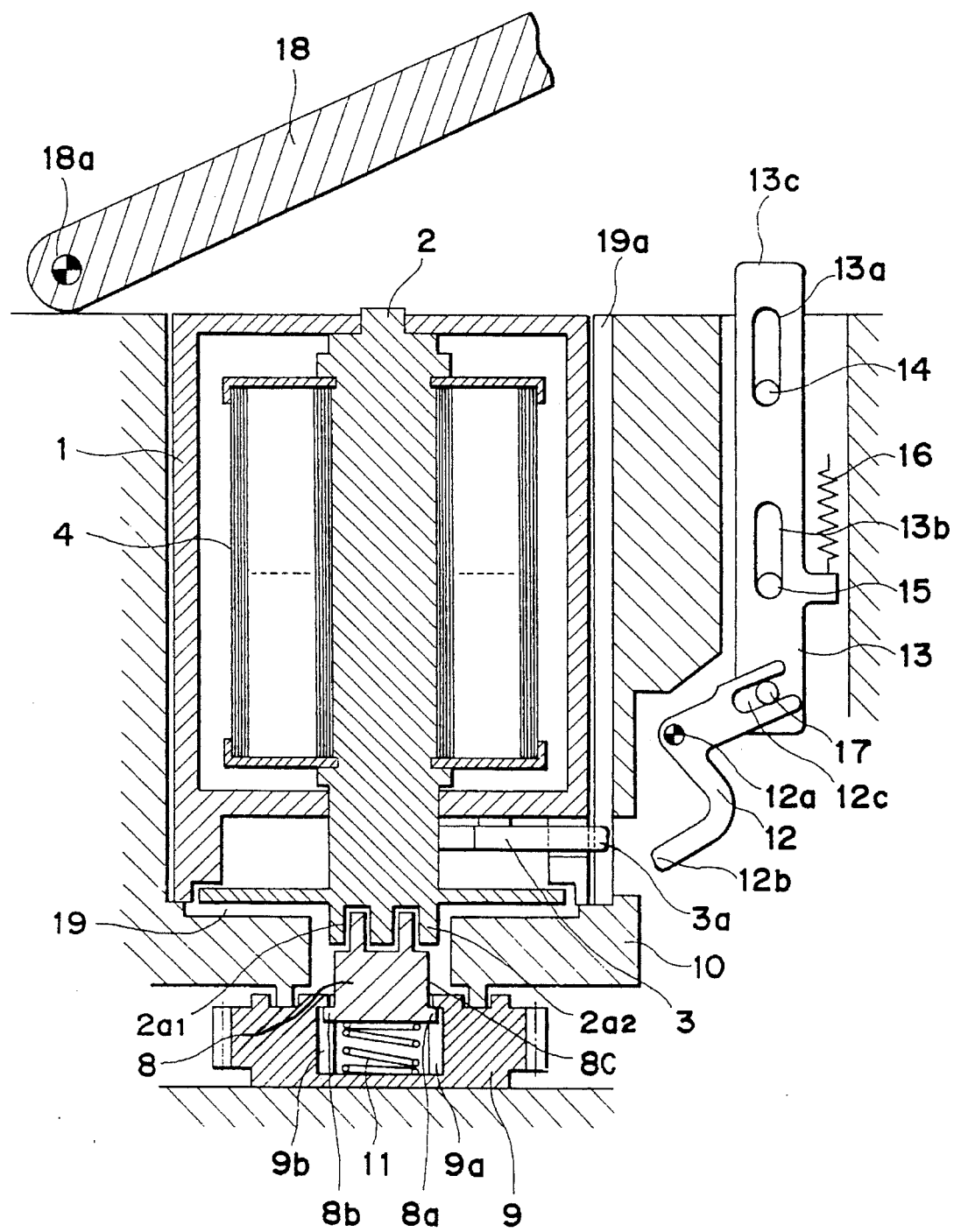
FIG. 1 is a longitudinal sectional view showing a cartridge chamber and its vicinity of a camera according to the first embodiment of the present invention.
Figure 2:
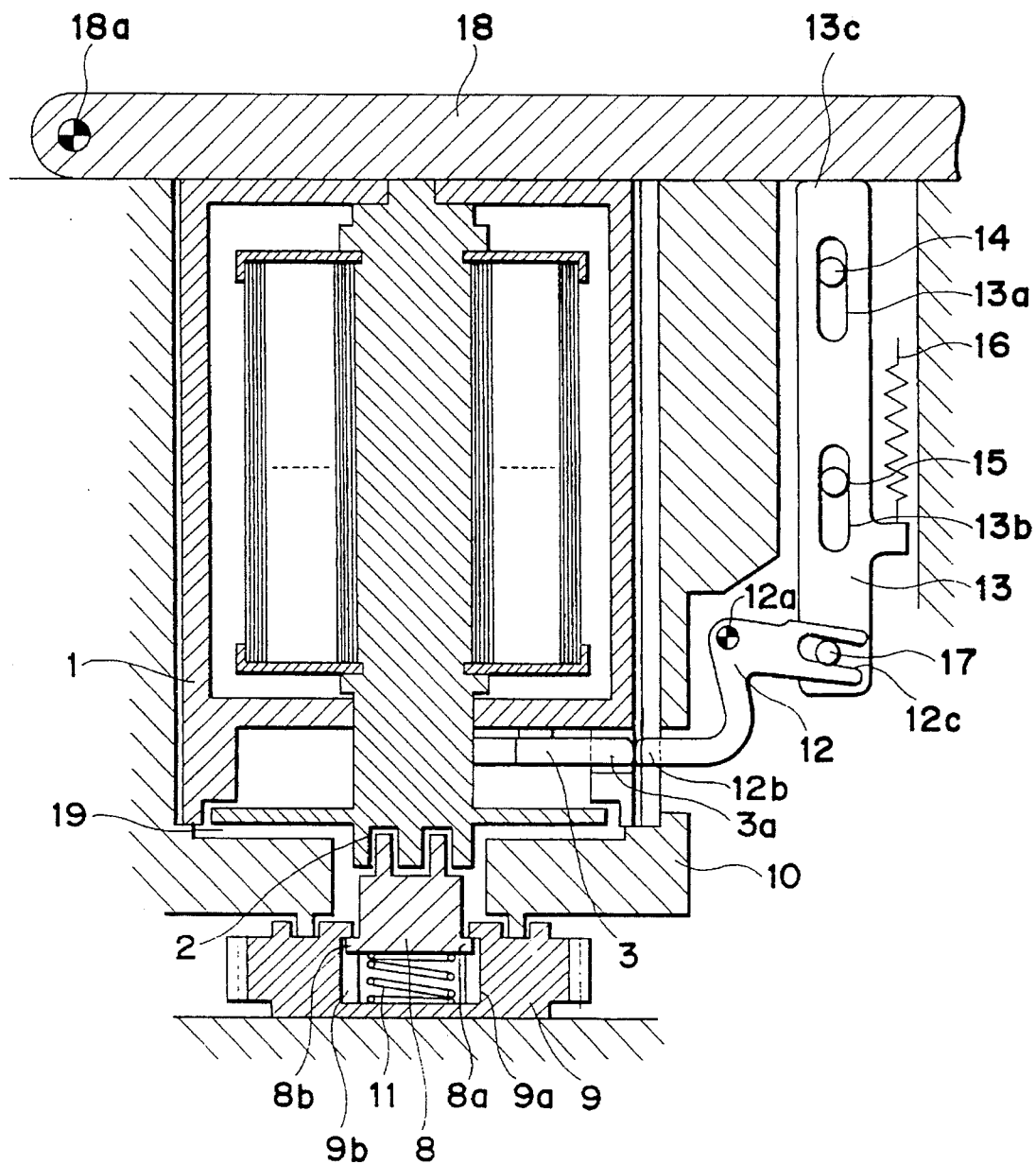
FIG. 2 is a longitudinal sectional view showing the cartridge chamber and its vicinity when a cartridge chamber lid is closed from the state in FIG. 1.

FIGS. 1 and 2 are views according to the first embodiment of the present invention.

Figure 38:
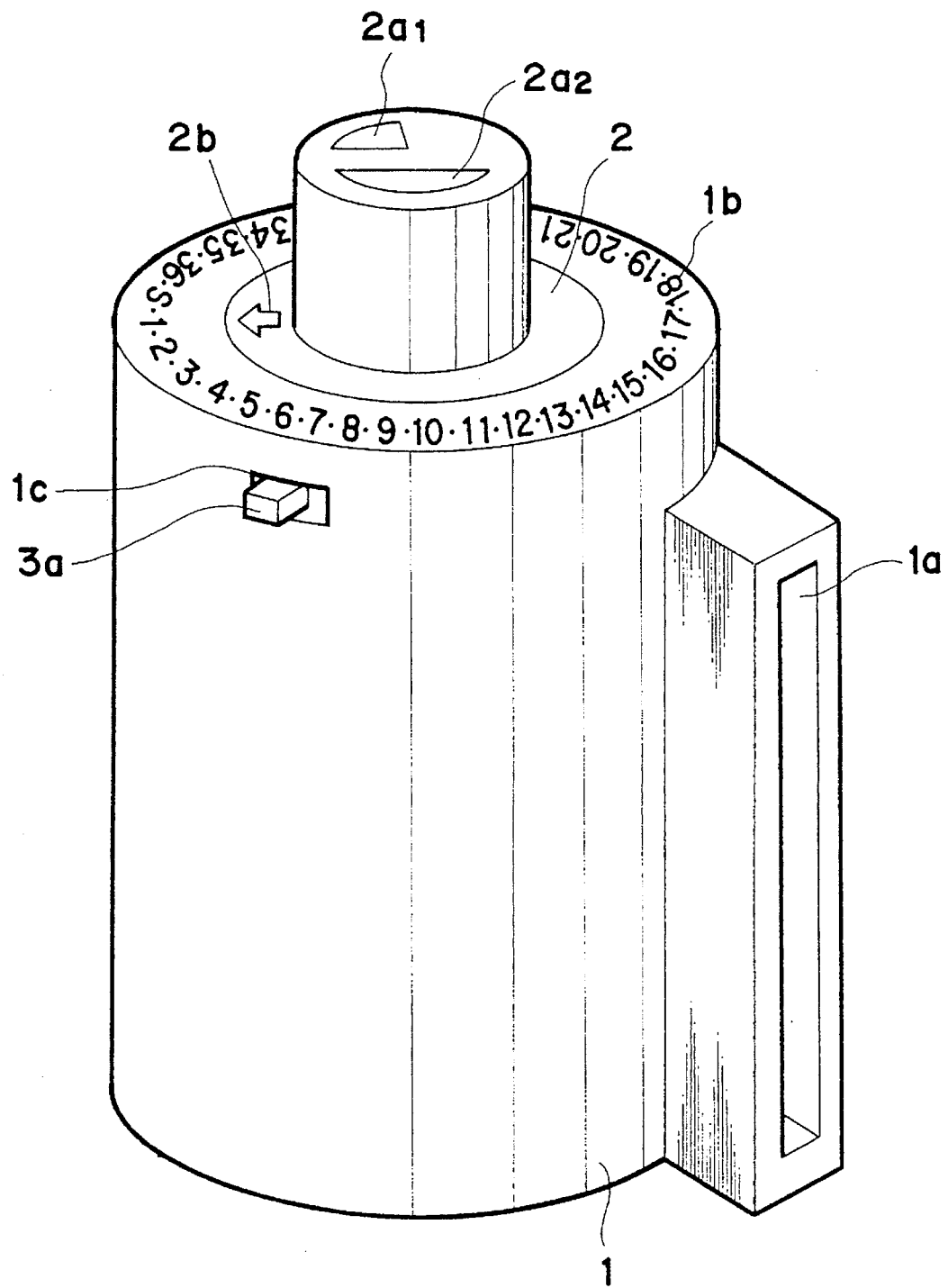
FIG. 38 is a perspective view of a known cartridge.
Figure 39:
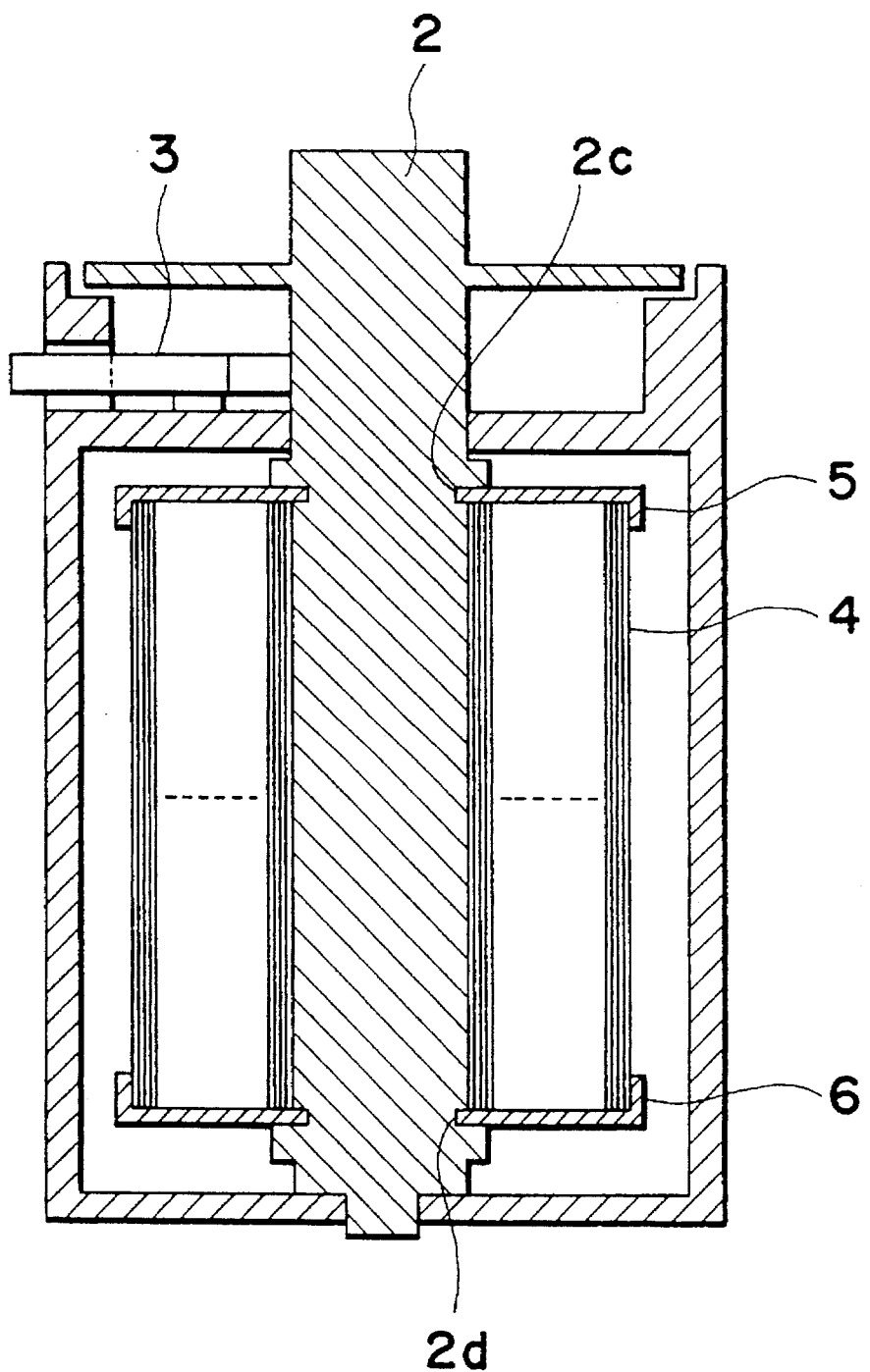
FIG. 39 is a longitudinal sectional view of the film cartridge shown in FIG. 38.
Figure 40:
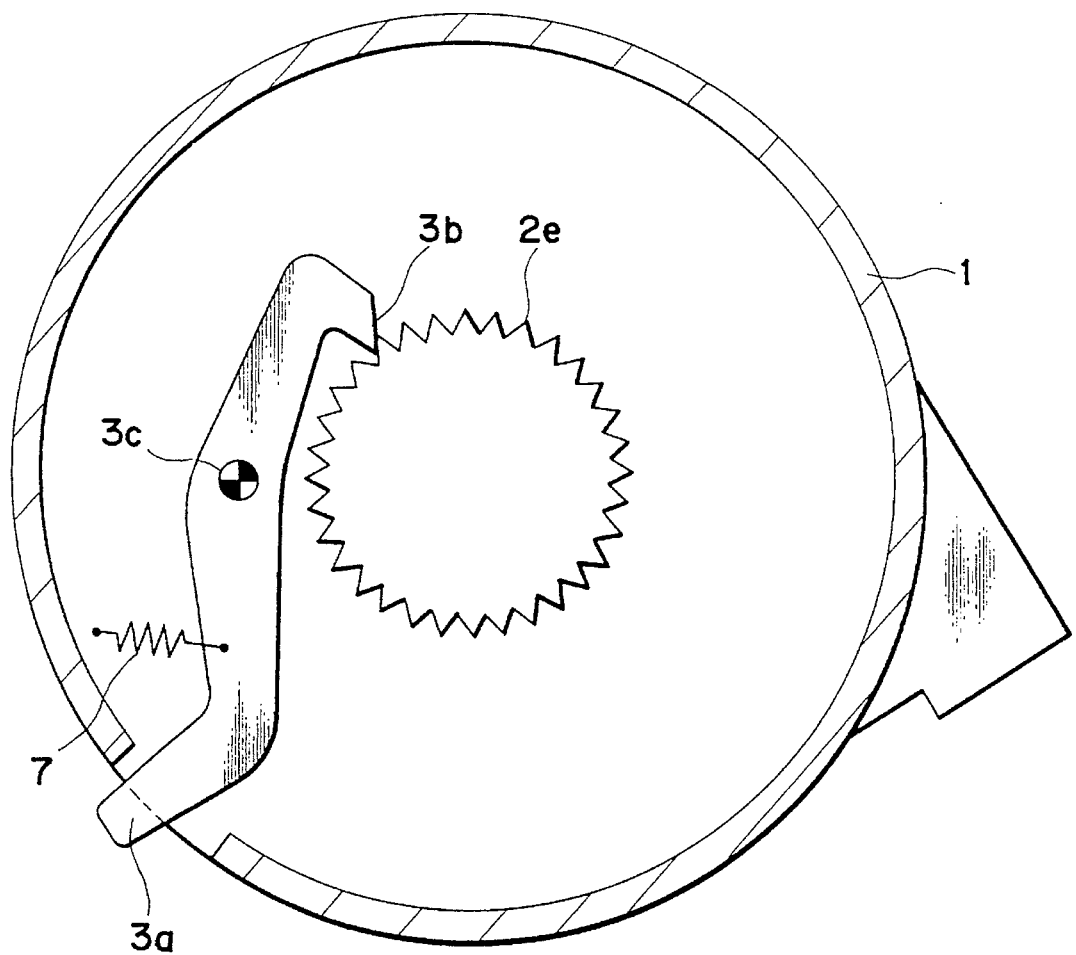
FIG. 40 is a cross-sectional view showing the main part of the film cartridge shown in FIG. 38.

The same reference numerals as in the known film cartridge in FIGS. 38 to 40 denote the same parts in FIGS. 1 and 2. A fork 8 is engaged with splines 2a1 and 2a2 of a supply spool 2 of a film cartridge to drive the supply spool 2. A fork gear 9 is meshed with a known film feed gear train and is driven thereby. The fork gear 9 is rotatably held in a camera body 10.

Since projections 8a and 8b of the fork 8 are fitted in grooves 9a and 9b of the fork gear 9, the fork 8 can be rotated together with the fork gear 9. A portion 8c of the fork 8 is also fitted in the fork gear 9 so that the fork 8 can be vertically moved. The projections 8a and 8b of the fork 8 abut against the end faces of the grooves 9a and 9b and are thus positioned.

A compression spring 11 biases the fork gear 9 and the fork 8 in opposite directions. A release lever 12 is mounted in the camera body to be pivotal about a shaft 12a. An arm portion 12b of the release lever 12 can be brought into contact with a projection 3a of a lock lever 3. Note that the arm portion 12b is kept separated from the projection 3a in the state shown in FIG. 1.

An interlocking lever 13 is slidable within the range of elongated holes 13a and 13b thereof such that projections 14 and 15 of the camera body are respectively engaged with the elongated holes 13a and 13b. One end of a spring 16 is fixed to the camera body, and the other end of the spring 16 is fixed to the interlocking lever 13, so that the spring 16 biases the interlocking lever 13 upward in FIGS. 1 and 2. A pin 17 is fixed on the interlocking lever 13 and is engaged with a groove 12c of the release lever 12 to be slidable therealong. When the interlocking lever 13 is moved downward, the release lever 12 is rotated clockwise. A cartridge chamber lid 18 is mounted to be rotatable about a shaft 18a and can abut against an end portion 13c of the interlocking lever 13. A film cartridge is loaded in a cartridge chamber 19, and a groove 19a is formed in the side surface of the cartridge chamber 19.

When the film cartridge is to be loaded in the cartridge chamber 19, the projection 3a of the lock lever 3 extends from an outer cover 1. Since this projection 3a passes through the groove 19a, the film cartridge can be loaded while rotation of the supply spool 2 is kept inhibited by the lock lever 3 (FIG. 1).

When the cartridge chamber lid 18 is closed from the state shown in FIG. 1, the cartridge chamber lid 18 is brought into contact with the end portion 13c of the interlocking lever 13, and the interlocking lever 13 is moved downward against the biasing force of the spring 16. The release lever 12 is rotated clockwise, accordingly. The arm portion 12b of the release lever 12 pushes the projection 3a of the lock lever 3, thereby releasing the supply spool 2 from rotation inhibition by the lock lever 3 (FIG. 2).

The state shown in FIG. 2 is a state in which a film can be fed by a known film feed system.

When photographing of a predetermined number of frames is completed, a film 4 is rewound into the film cartridge, and the supply spool 2 is rotated to a position indicating the use state of the film 4. A user removes the film cartridge. At this time, the user opens the cartridge chamber lid 18 in the state in FIG. 2.

The contact state between the end portion 13c of the interlocking lever 13 and the cartridge chamber lid 18 is released, and the interlocking lever 13 is moved upward by the biasing force of the spring 16. The release lever 12 is rotated counterclockwise accordingly, and the projection 3a of the lock lever 3 having pushed by the arm portion 2b is released. As a result, rotation of the supply spool 2 is inhibited by the lock lever 3, and the supply spool 2 is not accidentally rotated. That is, the state shown in FIG. 1 is restored.

The user then turns over the camera or holds and pulls the film cartridge up, so that the film cartridge can be removed from the cartridge chamber 19.

FIGS. 3 to 10 are views according to the second embodiment of the present invention.

A camera of this embodiment comprises a camera cover 51, a camera body 52, a finder 54, a rear cover 55 constituting part of the cartridge case, and an elongated hole 55a through which a film fed from the film cartridge passes. When the film cartridge is to be loaded, the rear cover 55 is rotated about a shaft 58 (to be described in detail later) until it abuts against a stopper 51a.

Projections 63 and 64 of the rear lid 55 are fitted in elongated holes 56a and 56b of an opening/closing lever 56, so that the lever 56 can be slidably moved within the range of the elongated holes 56a and 56b. An arm portion 56c of the opening/closing lever 56 extends from the rear lid 55 and can be manually operated. The opening/closing lever 56 also has a tapered portion 56g and an upright portion 56f brought into contact with a projection 3a of a lock lever 3 of the film cartridge.

Rubber 57 is used to cover a gap. A shaft 58 is fixed to a fork driving gear 60 comprising a bevel gear. The rear lid 55 is rotatably supported on the shaft 58. A fork 59 is rotatably mounted on the bottom portion of the rear lid 55 constituting the cartridge case together with the camera body 52. A fork portion 59a of the fork 59 can be engaged with the supply spool 2 of the film cartridge.

The fork driving gear 60 is directly connected to a feed motor (not shown) through a reduction gear system (not shown). A bevel gear 61 is always meshed with the fork driving gear 60. Since a projection 59c of the fork 59 is fitted in a groove 61a of the bevel gear 61, the fork 59 is rotated together with the bevel gear 61. At the same time, the fork 59 can be moved in a direction indicated by an arrow A in FIG. 4 and a direction opposite to the direction indicated by the arrow A with respect to the bevel gear 61.

One end of a spring 62 is fixed to the opening/closing lever 56, and the other end of the spring 62 is fixed to the rear lid 55. The spring 62 biases the opening/closing lever 56 upward in FIG. 6.

Figure 9:
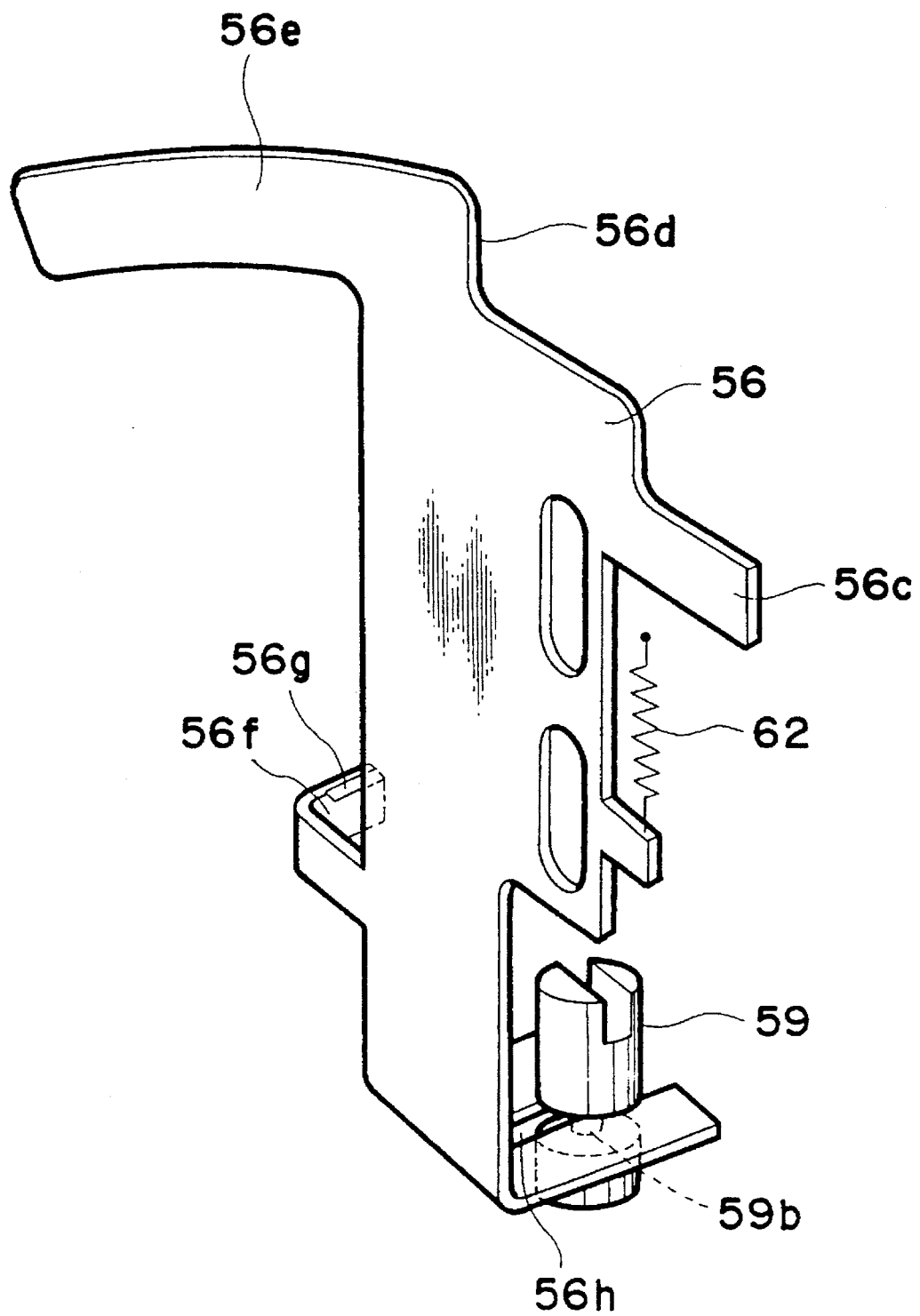
FIG. 9 is a perspective view showing the structure of the opening/closing lever shown in FIG. 3.

A small-diameter portion 59b of the fork 59 is engaged with a groove 56h of the opening/closing lever 56, as shown in FIG. 9. The fork 59 is moved in a direction indicated by an arrow A or a direction opposite to the direction indicated by the arrow A upon vertical movement of the opening/closing lever 56. The bevel gear 61 has a bevel gear portion 61b always meshed with the fork driving gear 60.

Figure 5:
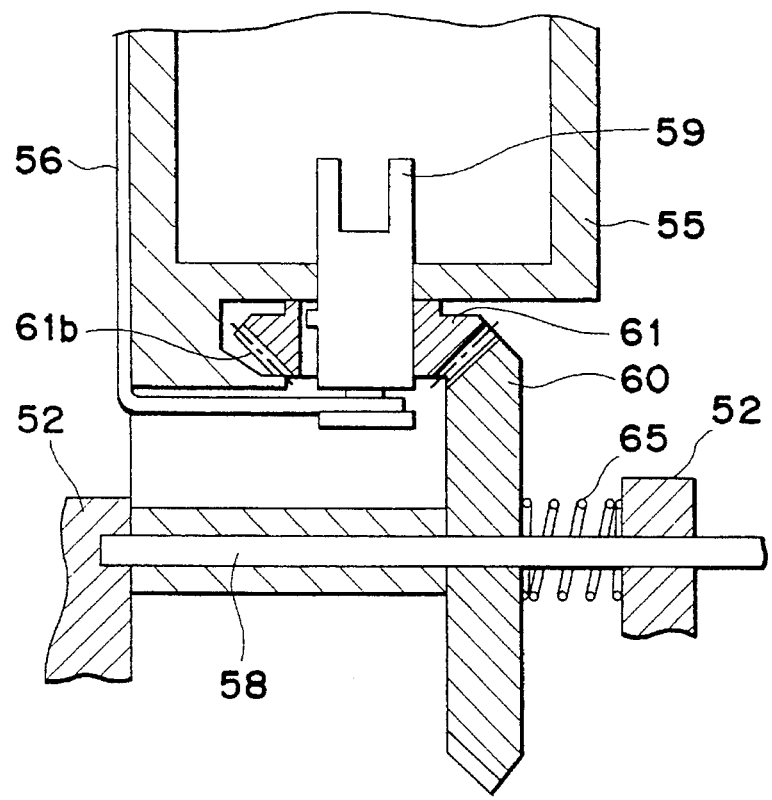
FIG. 5 is a longitudinal sectional view showing a fork portion and its vicinity in FIG. 4 in detail.

A spring 65 always biases the fork driving gear 60 to the left in FIG. 5. Even if the fork 59 is accidentally stopped, the bevel gear 61 is disengaged from the fork driving gear 60 against the biasing force of the spring.

Figure 4:
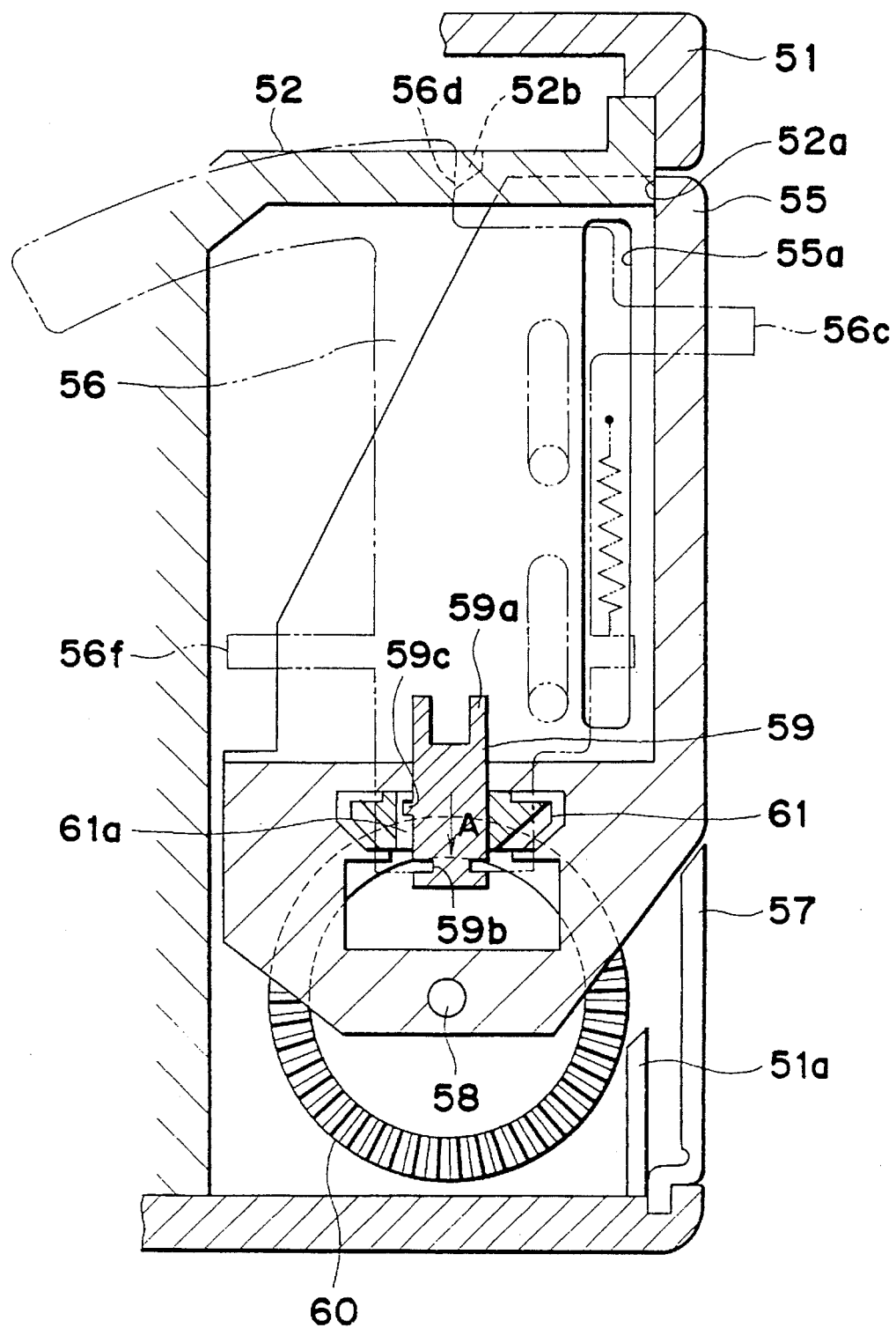
FIG. 4 is a longitudinal sectional view showing a cartridge chamber and its vicinity in FIG. 3.
Figure 6:
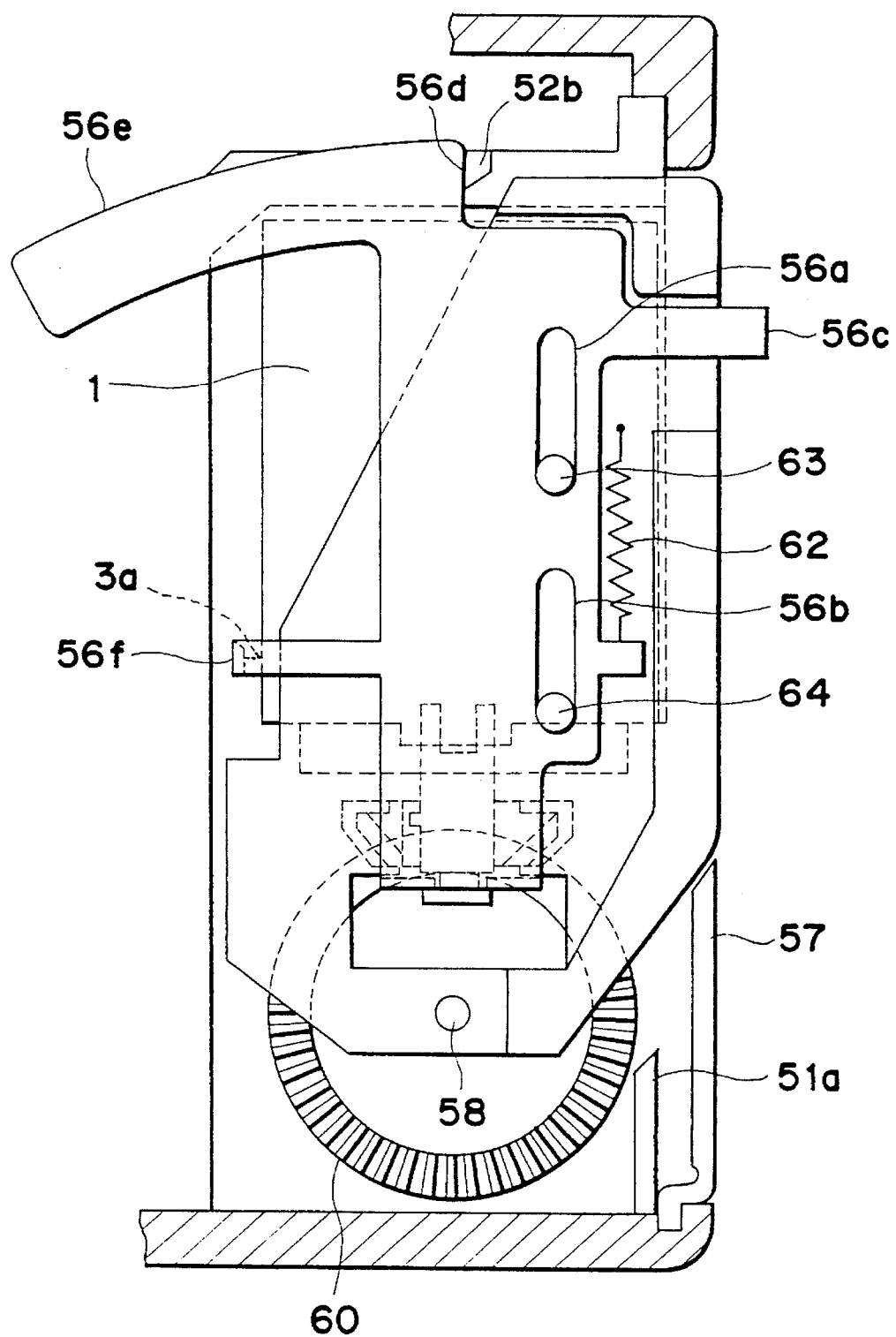
FIG. 6 is a longitudinal sectional view showing a state in which a film cartridge is loaded in the cartridge chamber shown in FIG. 4.

In a state wherein the rear lid 56 is kept closed, a portion 56d of the opening/closing lever 56 is engaged with a projection 52b formed on the camera body 52, thereby locking the rear lid 55, as shown in FIGS. 4 and 6.

Figure 11:
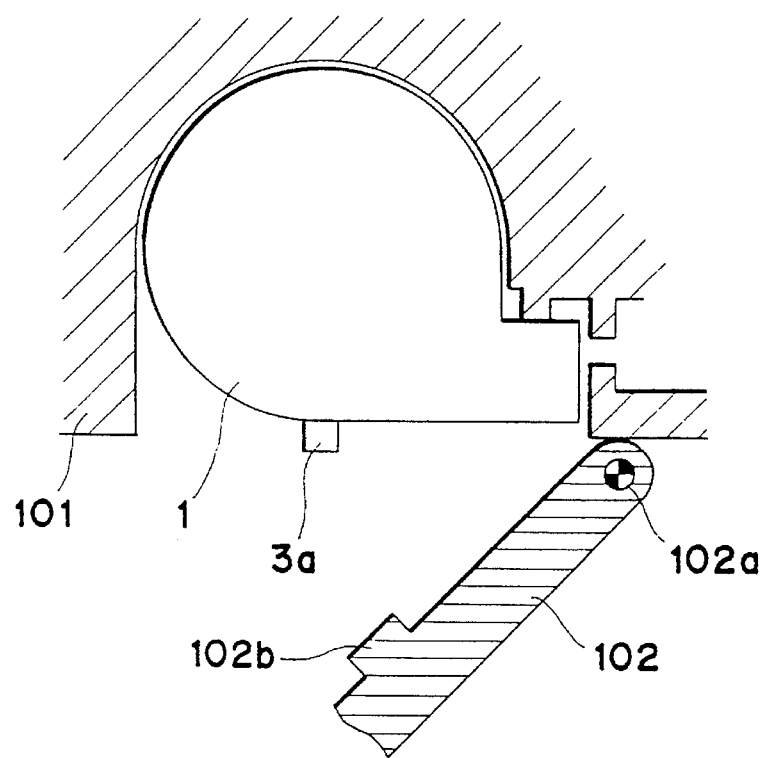
FIG. 11 is a cross-sectional view showing a cartridge chamber and its vicinity of a camera according to the third embodiment of the present invention.

When the arm portion 56c is manually moved downward against the biasing force of the spring 62 to open the rear lid 55, the projection 52b is disengaged from the portion 56d, so that the rear lid 55 can be opened. In this case, a portion 56e of the opening/closing lever 56 is in slidable contact with the projection 52b of the camera body 52 or located therebelow. This state is shown in FIG. 11. In this state, the opening/closing lever 56 keeps depressing the fork 59 downward. The fork portion 59a of the fork 59 is kept disengaged from the supply spool 2 of the film cartridge.

In the above structure, loading of the film cartridge will be described below.

Figure 8:
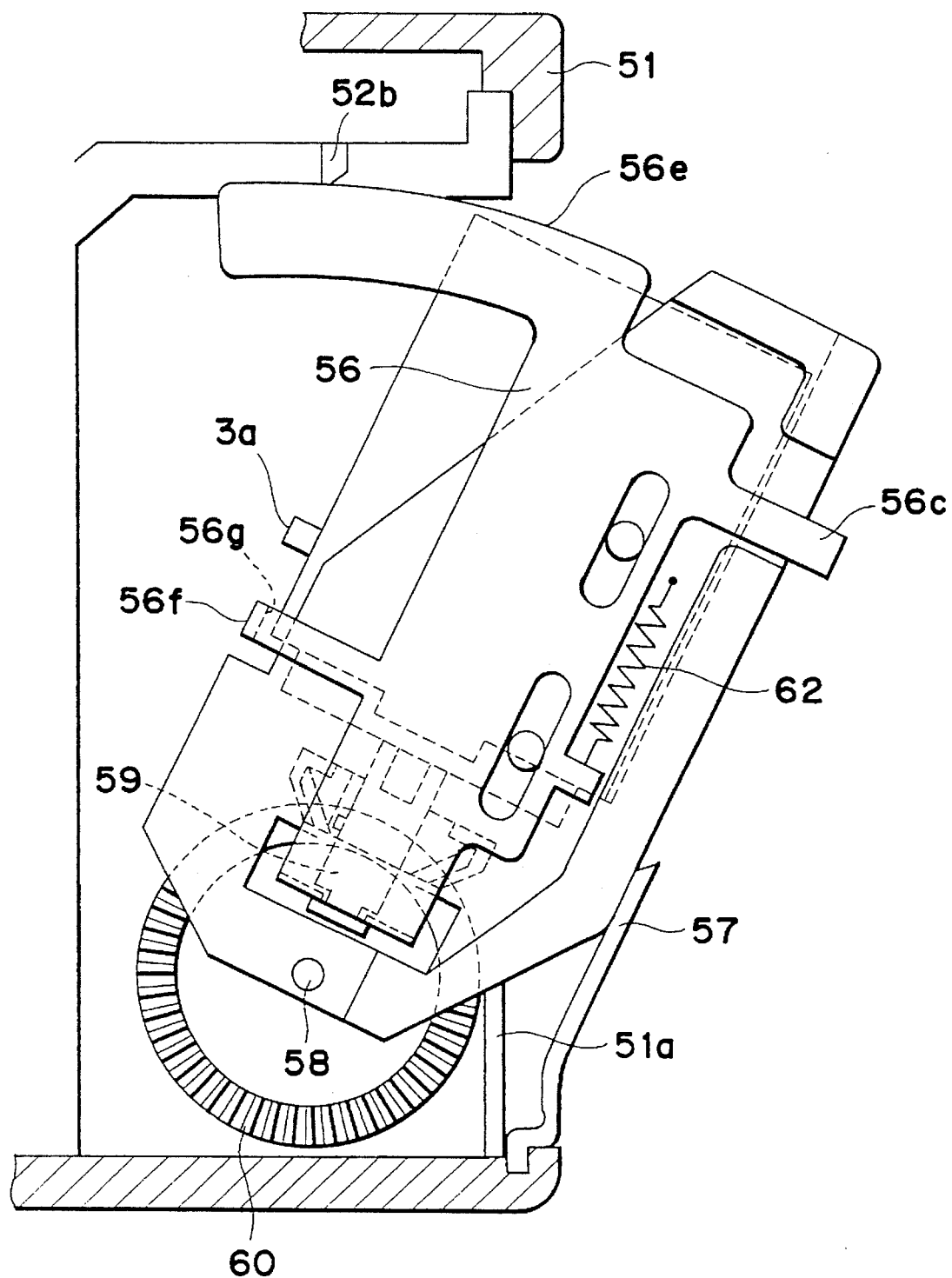
FIG. 8 is a longitudinal sectional view showing a state in which the cartridge chamber lid is opened from the state shown in FIG. 6.

In order to load the film cartridge, the rear lid 55 is opened until it is brought into contact with a stopper 51a, as shown in FIG. 8. In this case, since the rear lid 55 is pivoted about the shaft 58, the meshed state between the fork driving gear 60 and the bevel gear 61 is maintained. Upon counterclockwise pivotal movement of the rear lid 55, the bevel gear 61 is rotated on the fork driving gear 60 in the same direction. At this time, since the fork driving gear 60 is directly connected to a feed motor (not shown) through a reduction gear system (not shown), the fork driving gear 60 is not rotated. For this reason, the fork 59 and the bevel gear 61 are rotated about their own axes during opening of the rear lid 55.

Figure 3:
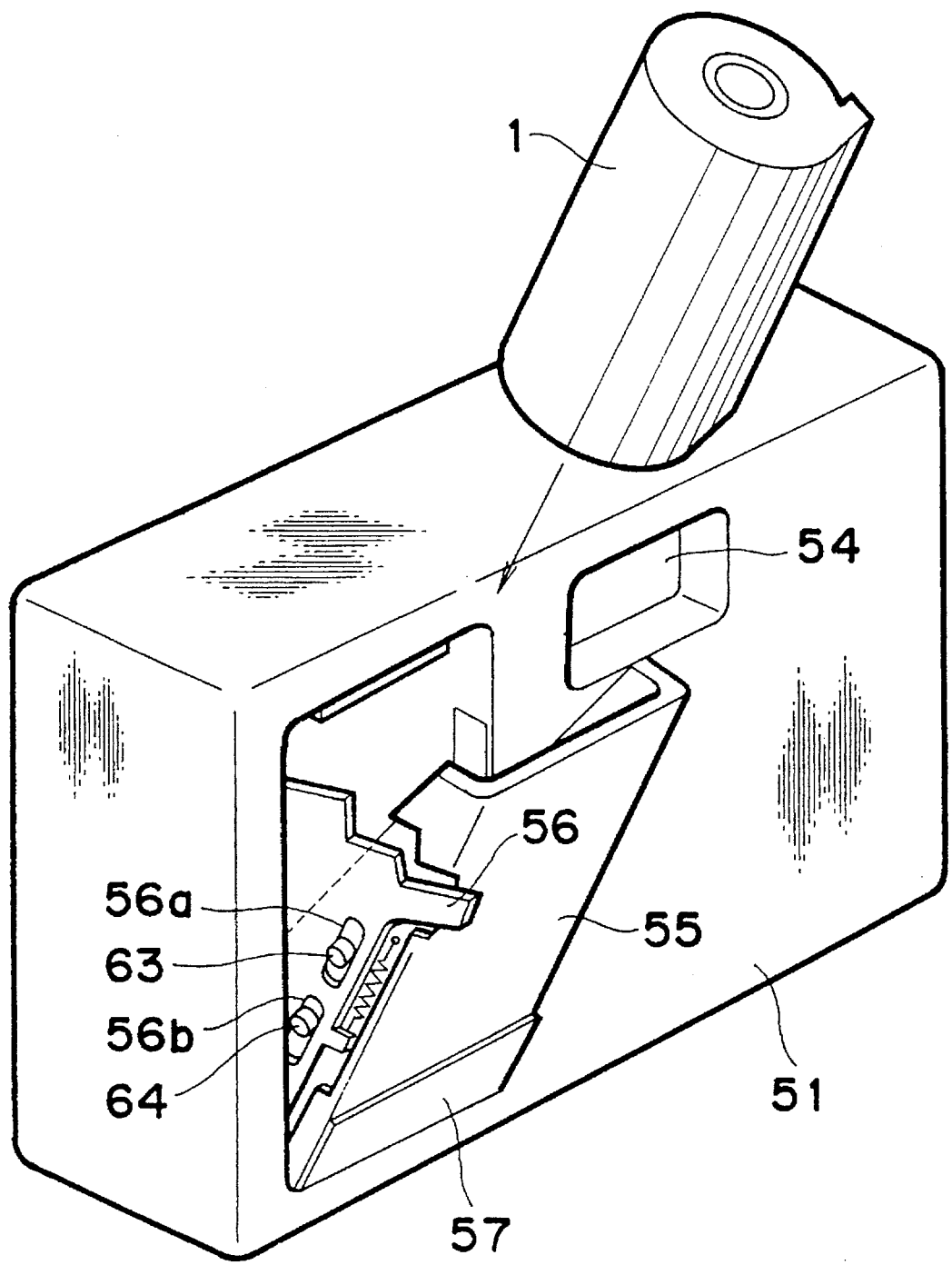
FIG. 3 is a perspective view showing a camera according to the second embodiment of the present invention.

The film cartridge is loaded in the above state (FIG. 3). In this case, as described above, since the opening/closing lever 56 is moved downward by the projection 52b of the camera body 52 to move the fork 59 downward, the fork portion 59a is kept disengaged from the supply spool 2 of the film cartridge.

Figure 10:
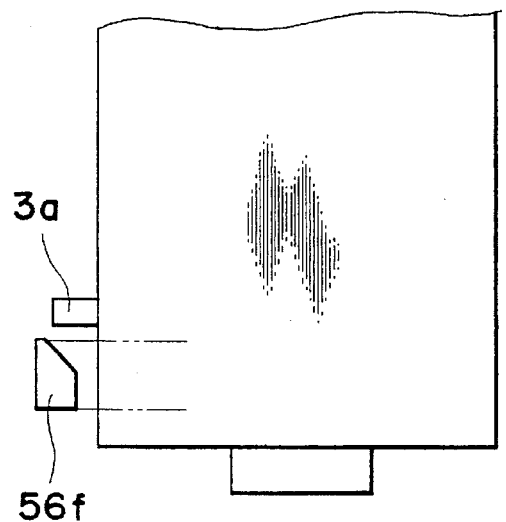
FIG. 10 is a side view showing the relationship between the film cartridge and the opening/closing lever in the state shown in FIG. 8.

As shown in FIGS. 10 and 8, the upright portion 56f is not in contact with the projection 3a of the lock lever 3 of the film cartridge. Therefore, rotation of the supply spool 2 is inhibited by the lock lever 3.

The rear lid 55 is then closed. In this case, the rear lid 55 is pivoted clockwise about the shaft 58 in a manner opposite to that described above. The bevel gear 61 is rotated on the fork driving gear 60 set in a rotation disable state in the same direction as that of the rear lid 55. In this case, the meshed state between the fork driving gear 60 and the bevel gear 61 of the fork 59 is maintained in the same manner as described above. For this reason, the bevel gear 61 and the fork 59 are rotated about their own axes. Since the fork portion 59a of the fork 59 is kept disengaged from the supply spool 2 of the film cartridge, the supply spool 2 will not be accidentally rotated.

When the rear lid 55 is brought into contact with an abutment portion 52a of the camera body 52, the projection portion 52b of the camera body 52 is released from the portion 56e of the opening/closing lever 56. The opening/closing lever 56 is moved upward by the biasing force of the spring 62, and the portion 56d of the opening/closing lever 56 is engaged with the projection 52b of the camera body 52, thereby completing the closing operation of the rear lid 55.

Figure 7:
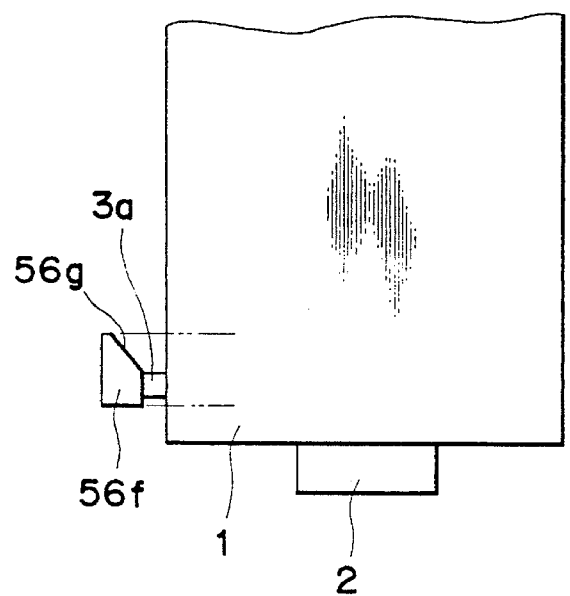
FIG. 7 is a side view showing a relationship between the film cartridge and an opening/closing lever in the state shown in FIG. 6.

At the same time, since the fork 59 is moved upward, the fork portion 59a thereof is engaged with the supply spool 2 of the film cartridge. When the phase of the fork portion 59a is not matched with that of the splines 2a1 and 2a2 of the supply spool 2, the opening/closing lever 56 is stopped at a position where the fork portion 59a abuts against the supply spool 2. Even at this position of the opening/closing lever 56, the portion 56b is kept engaged with the abutment portion 52b, so that the rear lid 55 is kept locked at the closed position. When the fork 59 is rotated by the known gear train, and the phases of the fork portion 59a and the splines of the supply spool 2 are matched with each other, the fork 56 is moved upward together with the opening/closing lever 56. The fork portion 59a is engaged with the supply spool 2. In any case, during movement of the opening/closing lever 56 to a position where the fork portion 59a is engaged with the supply spool 2 of the film cartridge, the upright portion 56f is also moved upward, and the tapered portion 56g is brought into contact with the projection 3a of the lock lever 3 and urges it. As shown in FIGS. 7 and 6, the projection 3a of the lock lever 3 is kept depressed by the upright portion 56f. In this state, the supply spool 2, rotation of which is inhibited by the lock lever 3, is released. The supply spool 2 can be driven by the known gear train through the fork 59, thereby completing loading of the film cartridge. FIGS. 4 and 6 show this state (note that the film cartridge is not illustrated in FIG. 4).

Upon completion of photographing of a predetermined number of frames, when the film 4 is to be rewound in the film cartridge and the film cartridge is to be removed, the arm portion 56c of the opening/closing lever 56 is manually moved downward against the biasing force of the sprint 62, as described above. Therefore, the projection 52b of the camera body 52 is disengaged from the portion 56d of the opening/closing lever 56 to set the rear lid 55 in an open state.

In this case, the portion 56e of the opening/closing lever 56 is kept slid along the projection 52b or located below the projection 52b. This state is shown in FIG. 8. Since the opening/closing lever 56 keeps depressing the fork 59 an the fork portion 59a of the fork 59, and the fork portion 59a of the fork 59 is kept disengaged from the supply spool 2 of the film cartridge, the supply spool 2 of the film cartridge is not driven upon rotation of the fork 59 about its own axis. Since the upright portion 56f of the opening/closing lever 56 is moved downward and the projection 3a of the lock lever 3 is released, rotation of the supply spool 2 is inhibited by the lock lever 3.

Even if any impact acts on the camera, the supply spool 2 will not be accidentally rotated. Therefore, the erroneous use state of the film 4 will not be indicated.

Figure 12:
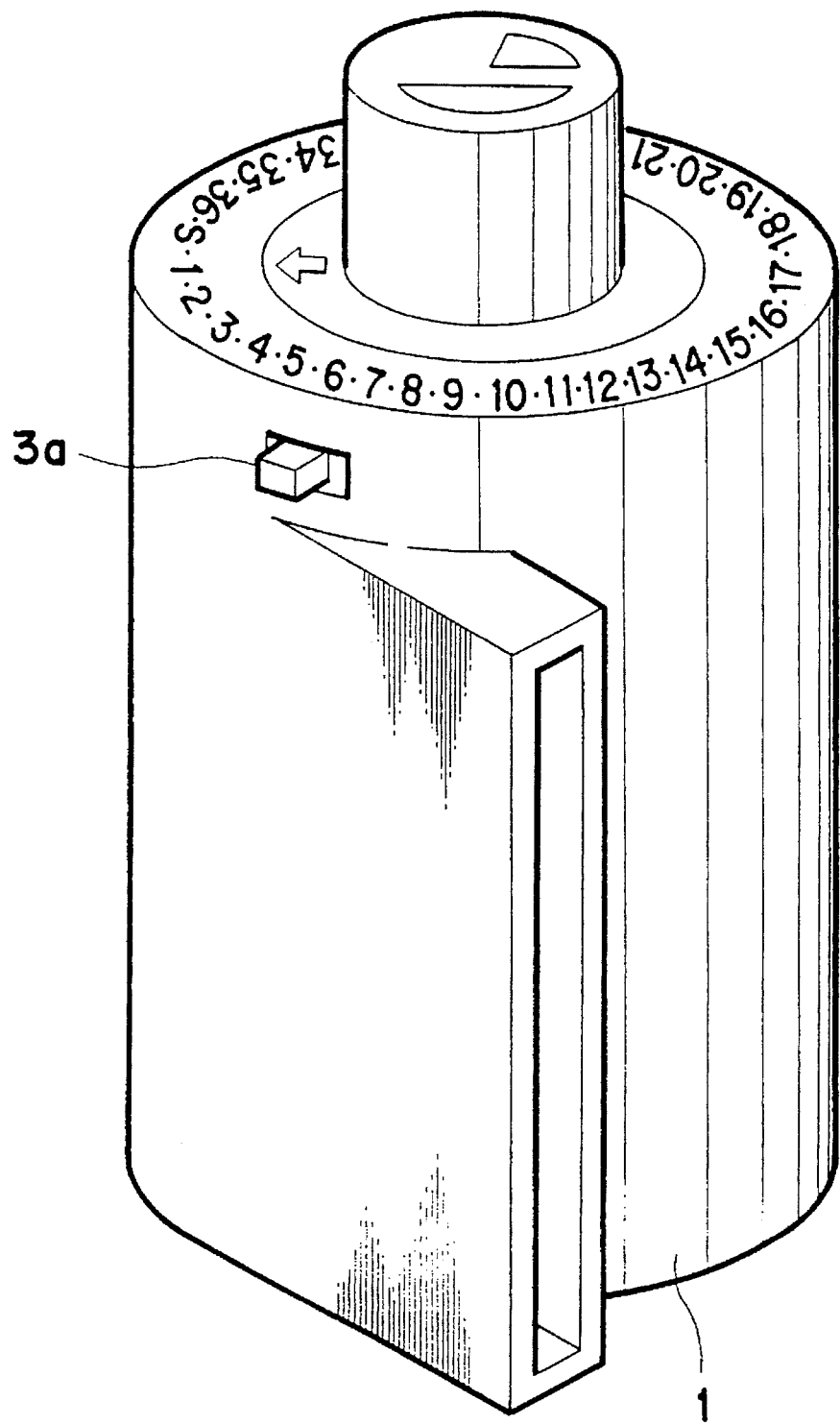
FIG. 12 is a perspective view showing a film cartridge used in the third embodiment of the present invention.

FIGS. 11 and 12 are views according to the third embodiment of the present invention.

Referring to FIG. 11, a camera of this embodiment has a camera body 101, a cartridge chamber lid 102 mounted in the camera body 101 to be pivotal about a shaft 102a, and a cartridge chamber 103.

FIG. 12 is a perspective view of a cartridge. When a projection 3a of a lock lever 3 is located at a position indicated in FIG. 14, the lock lever 3 can be directly switched by the cartridge chamber lid 102, as shown in FIG. 11.

More specifically, when the film cartridge is loaded in the cartridge chamber 103 and the cartridge chamber lid 102 is closed, the projection 3a of the lock lever 3 is pushed by a projection 102b of the cartridge chamber lid 102, so that a supply spool 2 can be rotated for the first time.

In each embodiment described above, since the state of a lock lever mounted in a film cartridge is switched in synchronism with an opening/closing operation of a cartridge chamber lid, accidental rotation of a supply spool during removal of the film cartridge can be prevented. In addition, by using a simple structure, this arrangement can be easily applied to a variety of cartridge chamber structures.

As has been described above, according to the first to third embodiments of the present invention, a switching means for switching the state of a locking means in synchronism with an opening/closing operation of the cartridge chamber lid is arranged. When the cartridge chamber lid is open, rotation of the supply spool can be inhibited by the locking means. When the cartridge chamber lid is closed, the supply spool, rotation of which is inhibited by the locking means, can be released. Therefore, by a simple structure, accidental rotation of the supply spool during removal of the film cartridge can be prevented in a variety of cartridge chamber structures.

Figure 13:
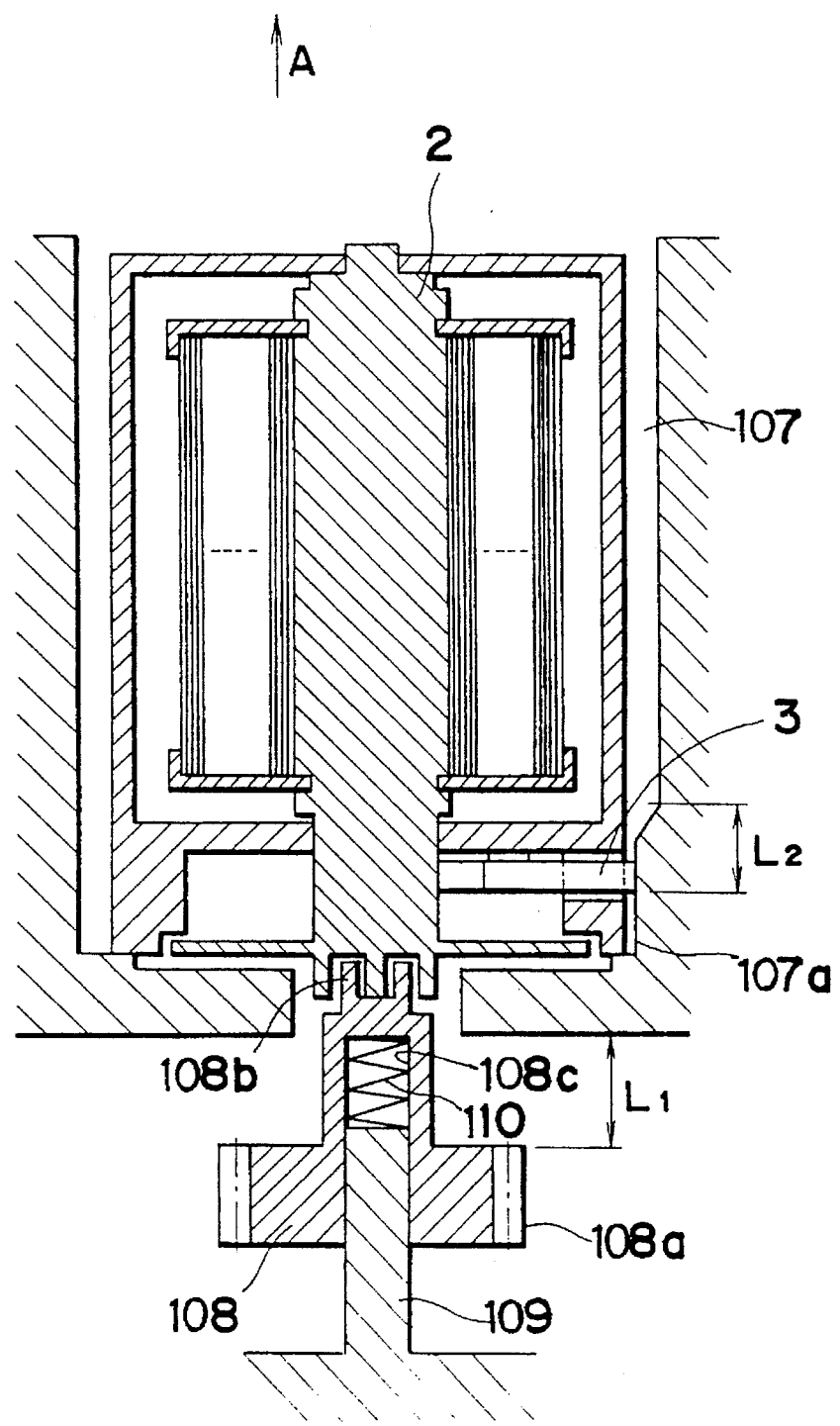
FIG. 13 is a longitudinal view showing a cartridge chamber and its vicinity when a film cartridge is loaded in a conventional camera.

In a camera wherein a film cartridge is loaded from the axial direction thereof, rotation of the supply spool 2 locked by the lock lever 3 (FIG. 38) is allowed only when the film cartridge (FIG. 38) is loaded in the cartridge chamber, as exemplified by a camera shown in FIG. 13.

FIG. 13 is a sectional view showing a state in which a film cartridge is loaded in a cartridge chamber of the camera. The film cartridge is ejected in a direction indicated by an arrow A.

Referring to FIG. 13, an engaging portion 108b of a fork 108 serving as a driving member is engaged with splines 2a of a supply spool 2 in a cartridge chamber 107. The fork 108 is engaged with a projection 109 from the body in a hole 108c and is rotatable on the projection 109 and movable in a direction indicated by an arrow A or a direction opposite to the direction indicated by the arrow A. A gear portion 108a meshes with a known film feed gear train. A compression spring 110 biases the fork 108 in the direction indicated by the arrow A.

When a film cartridge is kept loaded in the cartridge chamber 107, a projection 3a of a lock lever 3 is pushed by a surface 107a of the cartridge chamber 107, and rotation of the supply spool 2 is not locked. When the film cartridge is to be ejected from this state in the direction indicated by the arrow A, the fork 108 must be kept engaged with the supply spool 2 until the projection 3a of the lock lever 3 is disengaged from the surface 107a of the cartridge chamber 107 and rotation of the supply spool 2 is locked. If an ejection stroke of the film cartridge to release the lock lever 3 from the surface 107a and cause the lock lever 3 to lock the supply spool 2 in the direction indicated by the arrow A is defined as L2 and a stroke required for the fork 108 to follow ejection of the film cartridge in the direction indicated by the arrow A by means of the biasing force of the compression spring 110 is defined as L1, condition L1>L2 must be satisfied.

When the stroke L1 of the fork 108 is increased, however, the spring 110 applies a large biasing force in the direction indicated by the arrow A during loading of the film cartridge into the cartridge chamber 107. For this reason, a large force acts on the supply spool 2 through the fork 108 in the direction indicated by the arrow A even during normal feeding of the film, and a friction between the supply spool 2 and an outer cover 1 is increased. When the film cartridge is repeatedly used, the film cartridge or the fork may be damaged.

Figure 14:
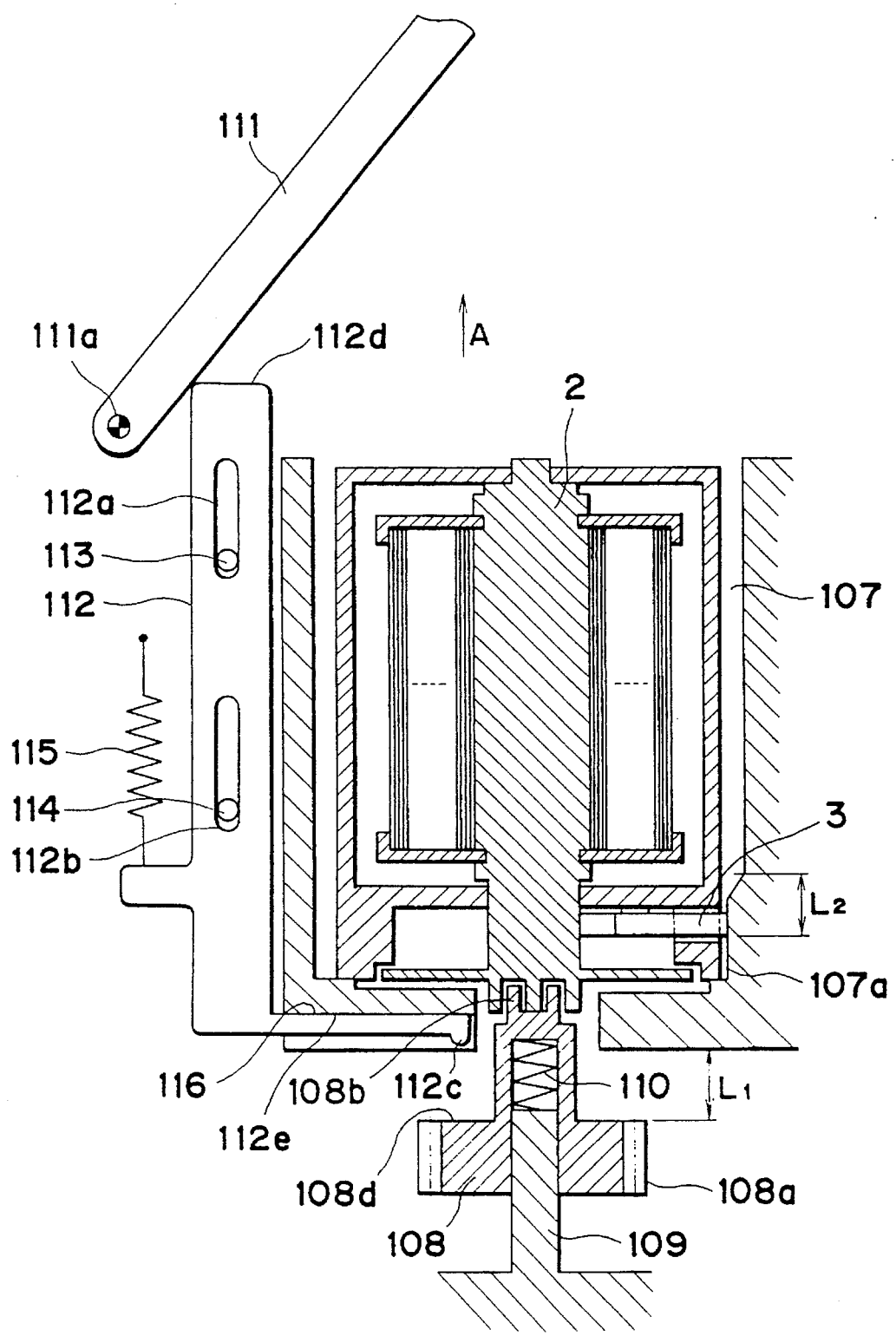
FIG. 14 is a longitudinal sectional view showing a cartridge chamber and its vicinity when a cartridge lid is opened according to the fourth embodiment of the present invention.
Figure 15:
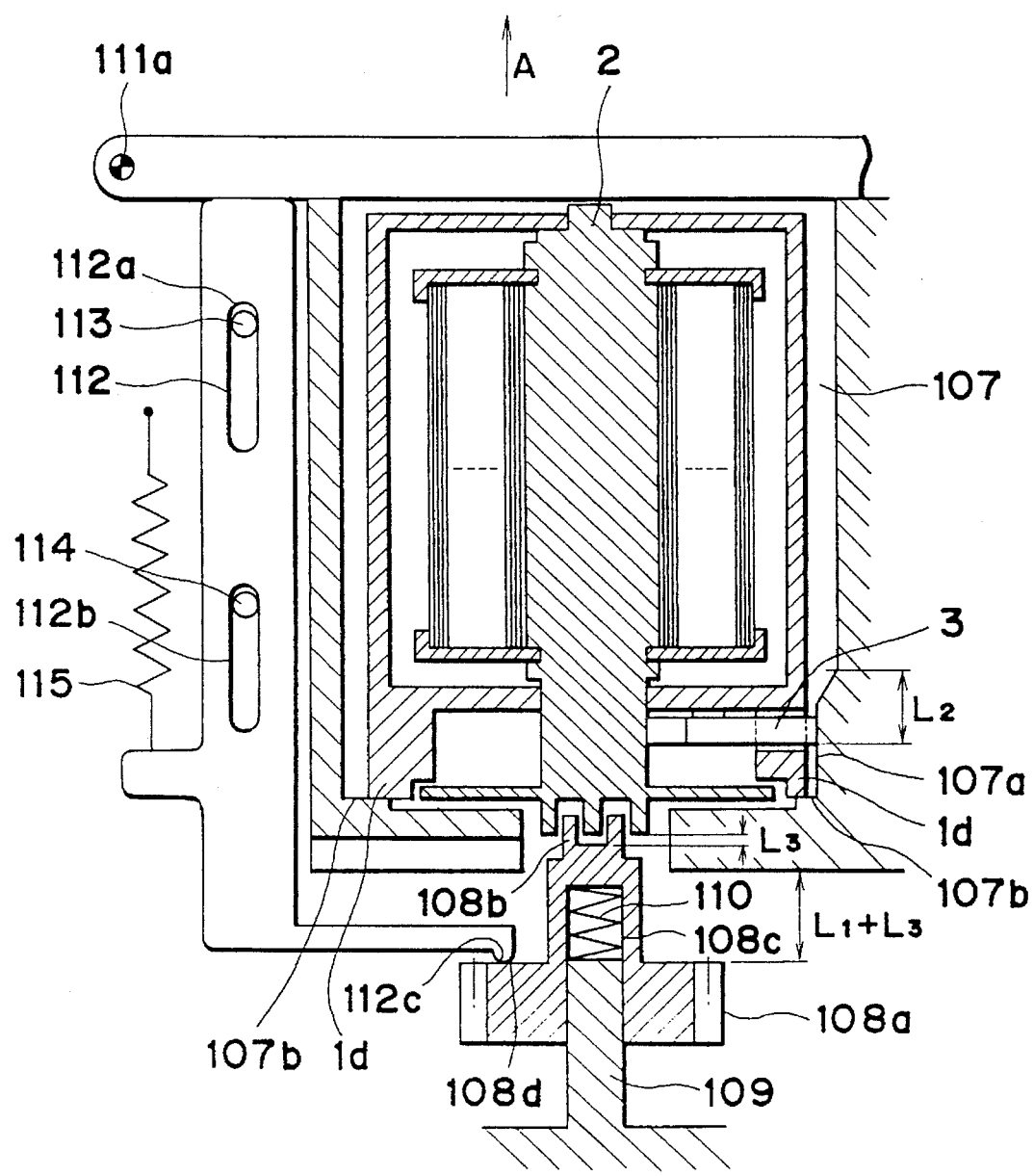
FIG. 15 is a longitudinal sectional view showing the cartridge chamber and its vicinity when the cartridge lid is closed from the state shown in FIG. 14.

FIGS. 14 and 15 are longitudinal sectional views showing a camera according to the fourth embodiment of the present invention. The same reference numerals as in FIG. 13 and FIGS. 38 to 40 denote the same parts in FIGS. 14 and 15.

Referring to FIG. 14 and 15, this camera comprises a cartridge lid 111 mounted in a camera body (not shown) to be pivotal about a shaft 111a, a release lever 112 slidable within the range of elongated holes 112a and 112b thereof such that projections 113 and 114 formed in the camera body (not shown) are respectively fitted in the elongated holes 112a and 112b. An end face 112d of the release lever 112 can be brought into contact with the cartridge lid 111 upon clockwise rotation of the cartridge lid 111. One end of a spring 115 is fixed to the camera body and the other end of the spring 115 is fixed to the release lever 112. The spring 115 biases the release lever 112 in a direction indicated by an arrow A.

FIG. 14 shows a state in which the cartridge chamber lid 111 is not closed. A portion 112e of the release lever 112 abuts against a camera body surface 116, so that the position of the release lever 112 in the direction indicated by the arrow A is regulated. In this state, a force from a spring 110 acts on the supply spool 2 through a fork 108.

FIG. 15 shows a state in which the cartridge chamber 107 is closed by a known mechanism upon clockwise rotation of the cartridge lid 111 from the state shown in FIG. 14.

When a surface 1d of the film cartridge abuts against a surface 107b of a cartridge chamber 107, the position of the film cartridge in a direction opposite to the direction indicated by the arrow A is regulated. During closing of the cartridge lid 111, the end face 112d of the release lever 112 is brought into contact with the cartridge lid 111 and is moved downward against the biasing force of the spring 115 in a direction opposite to the direction indicated by the arrow A. An arm portion 112c is brought into contact with a surface 108d of the fork 108 to move the fork 108 downward against the biasing force of the spring 110.

A gap L3 is formed between the fork 108 and the supply spool 2 of the film cartridge, and the biasing force of the spring 110 does not act on the supply spool 2 during film feeding.

Figure 16:
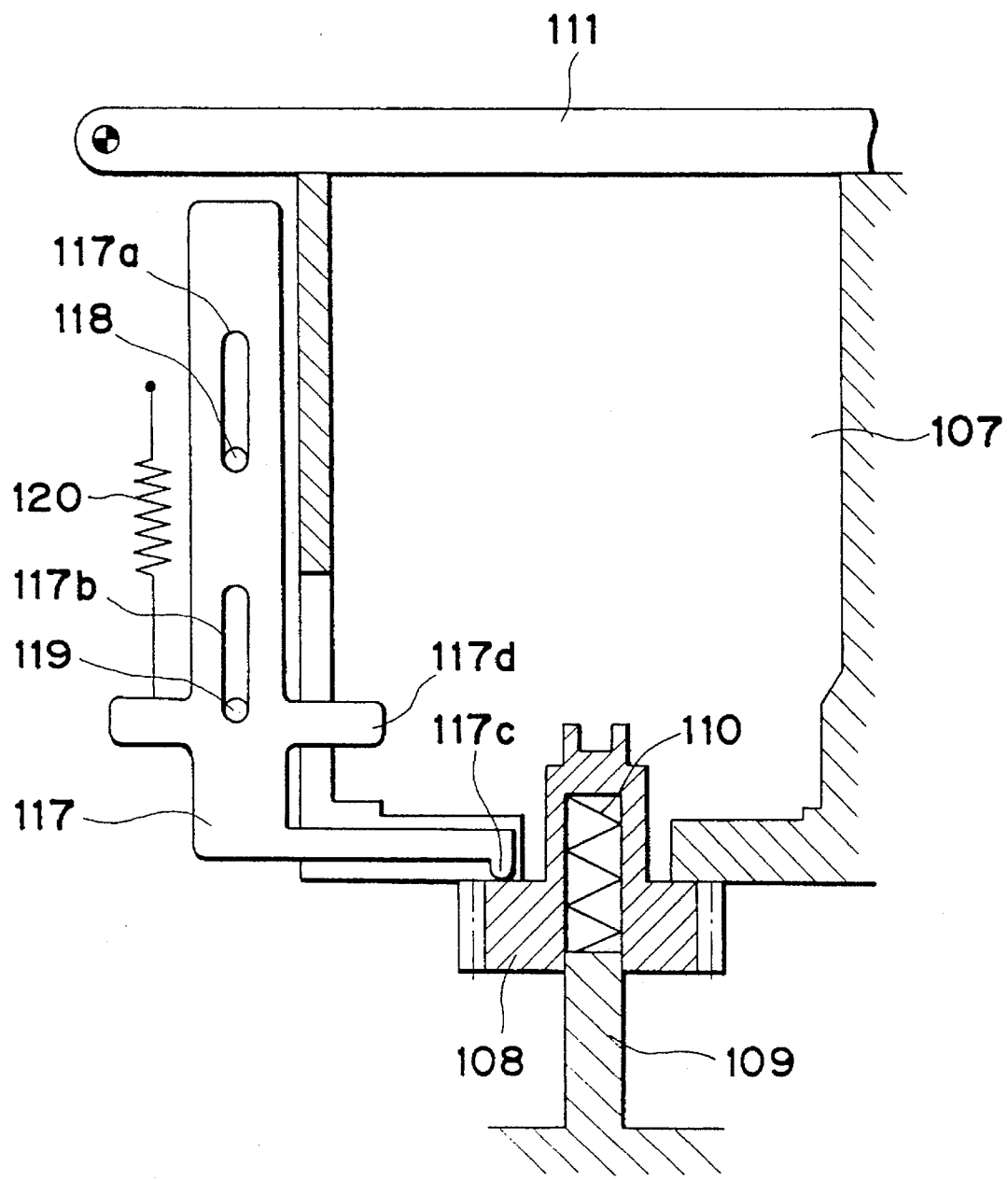
FIG. 16 is a longitudinal sectional view showing a cartridge chamber and its vicinity before a film cartridge is loaded according to the fifth embodiment of the present invention.
Figure 17:
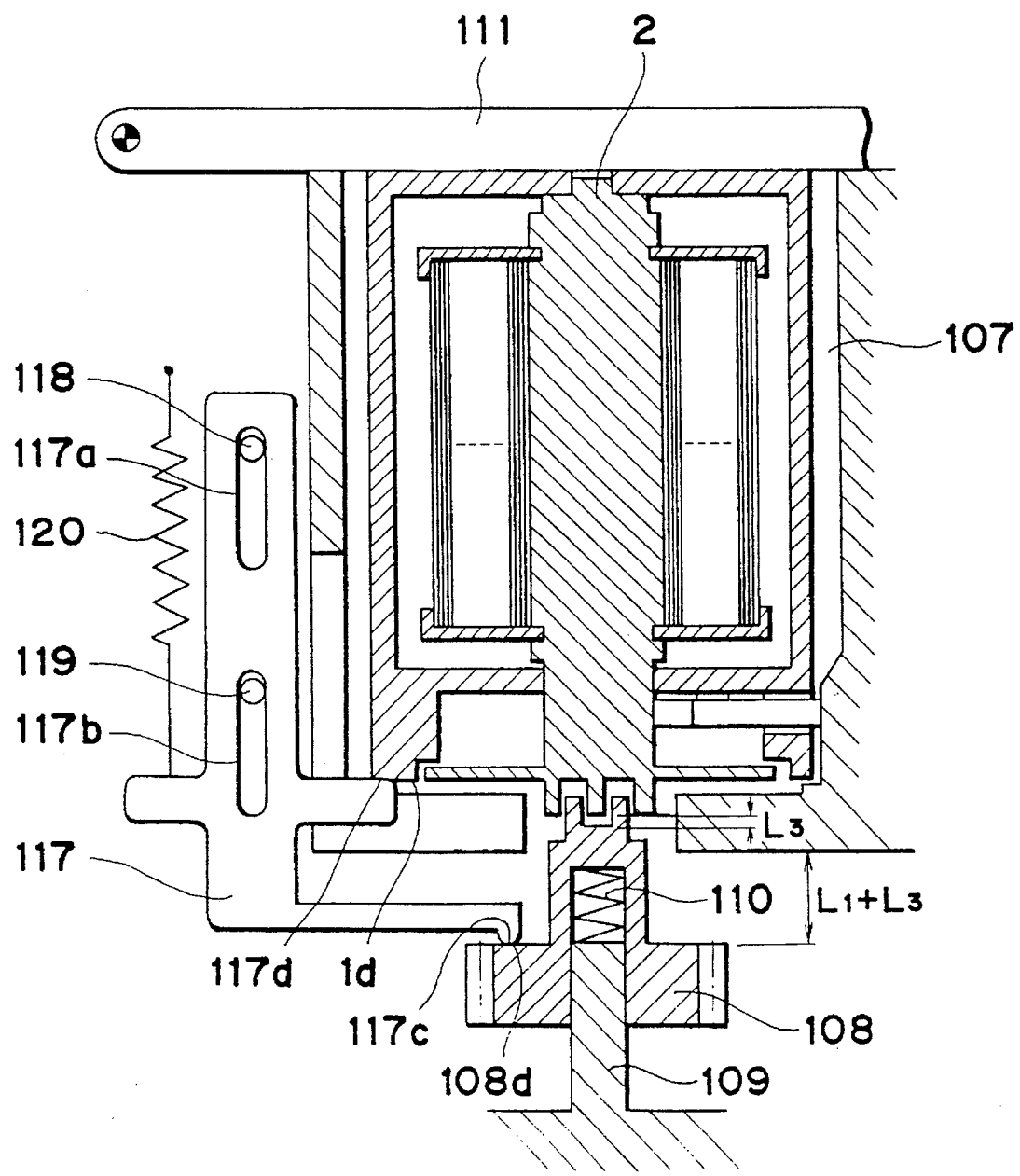
FIG. 17 is a longitudinal sectional view showing the cartridge chamber and its vicinity when the film cartridge is loaded according to the fifth embodiment of the present invention.

FIGS. 16 and 17 are longitudinal sectional views showing the fifth embodiment of the present invention. The same reference numerals as in the fourth embodiment denote the same parts in the fifth embodiment.

In the fifth embodiment, when a film cartridge is loaded in a cartridge chamber 107, a biasing force of a spring 110 does not act on a supply spool 2 of the film cartridge.

A cartridge interlocking lever 117 is slidable so that projections 118 and 119 formed on the camera body are respectively fitted in elongated holes 117a and 117b of the cartridge interlocking lever 117. One end of a spring 120 is fixed to the camera body, and the other end of the spring 120 is fixed to the cartridge interlocking lever 117. The spring 120 biases the cartridge interlocking lever 117 upward in FIGS. 16 and 17. The upper position of the cartridge interlocking lever 117 is defined such that the projection 118 or 119 abuts against the end face of the elongated hole 117a or 117b.

FIG. 16 shows a state in which the film cartridge is not loaded in the cartridge chamber 107. When the film cartridge is loaded from this state, a portion 1d of the film cartridge is brought into contact with an arm portion 117d of the cartridge interlocking lever 117. The cartridge interlocking lever 117 is moved downward against the biasing force of the spring 120. When the film cartridge is perfectly loaded in the cartridge chamber 107, an arm portion 117c of the cartridge interlocking lever 117 causes a surface 108d of a fork 108 to move downward against the biasing force of the spring 110, thereby assuring a gap L3 between the supply spool 2 and the fork 108.

This state is shown in FIG. 17. In this state, the biasing force of the spring 110 does not act on the supply spool 2.

Figure 18:
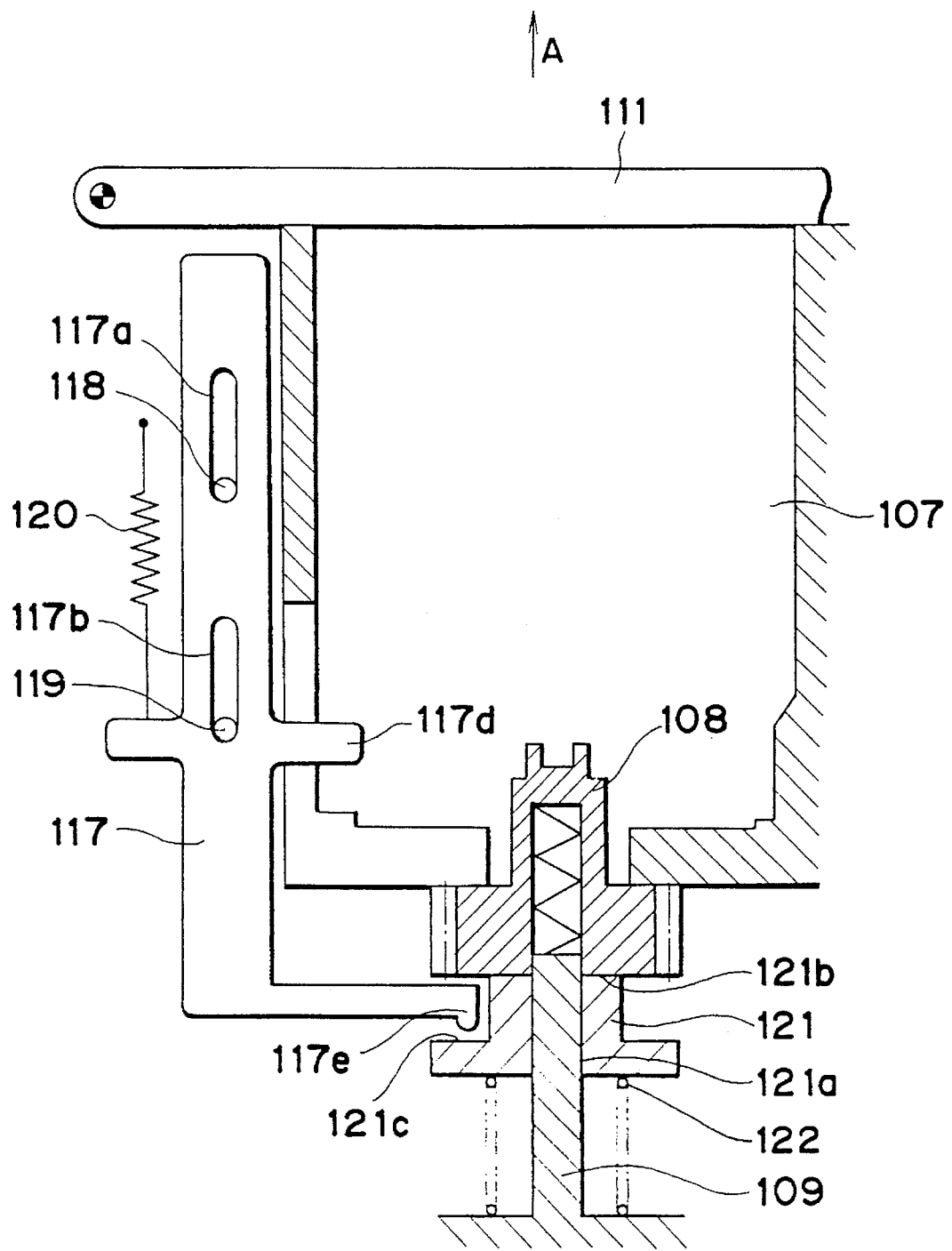
FIG. 18 is a longitudinal sectional view showing a cartridge chamber and its vicinity before a film cartridge is loaded according to the sixth embodiment of the present invention.
Figure 19:
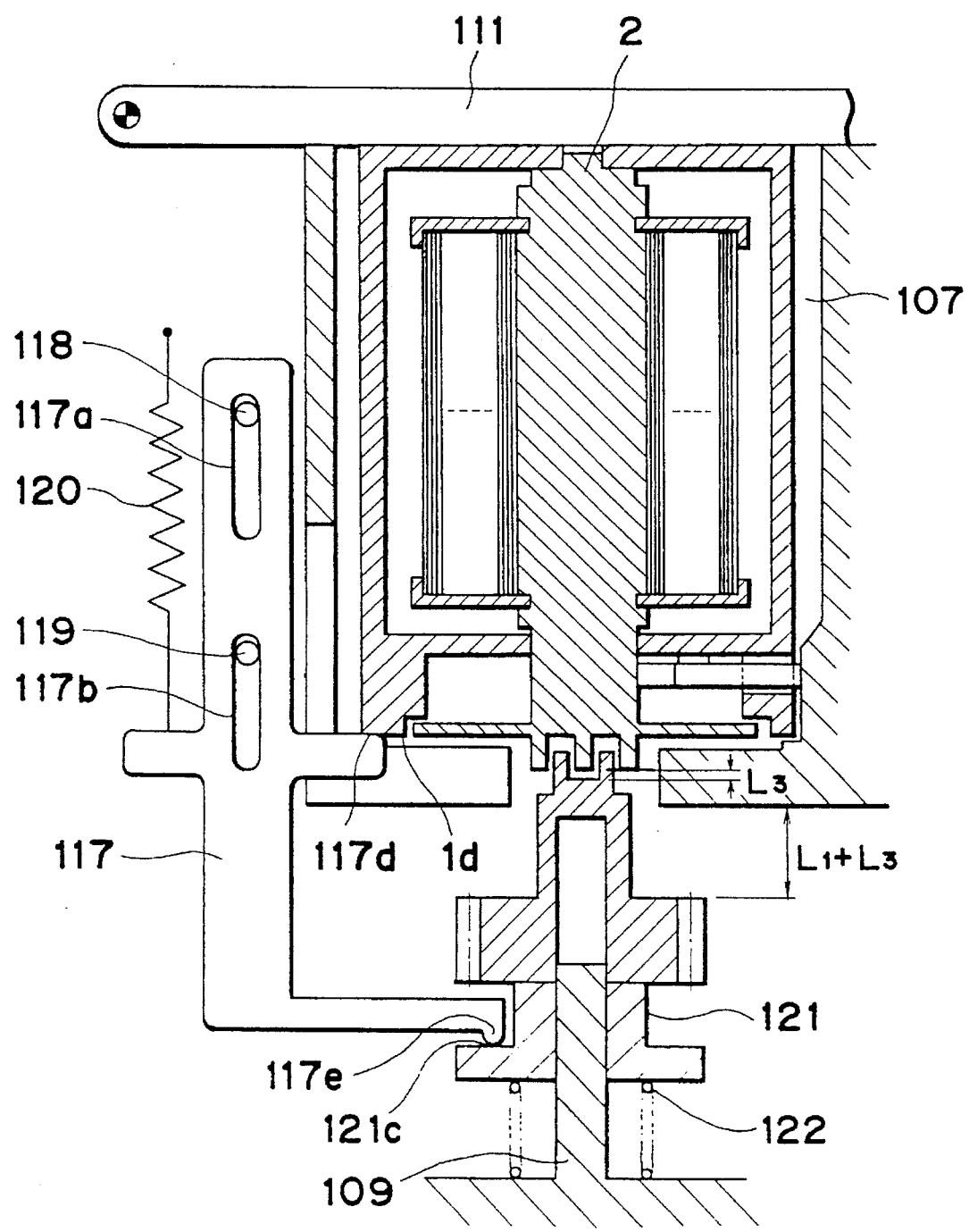
FIG. 19 is a longitudinal sectional view showing the cartridge chamber and its vicinity when the film cartridge is loaded according to the sixth embodiment of the present invention.

FIGS. 18 and 19 are longitudinal sectional views of a camera according the sixth embodiment of the present invention. The same reference numerals as in the fourth and fifth embodiments denote the same parts in the sixth embodiment.

In the fourth and fifth embodiments, by the biasing force of the spring (i.e., the spring 110) for causing the fork 108 to follow ejection of the film cartridge, the fork 108 is kept urged against another member (the arm portion 112c of the release lever 112 or the arm portion 117c of the cartridge interlocking lever 117) even during film feeding, thereby generating a load caused by the friction between the fork 108 and the arm portion 112c or 117c. In the sixth embodiment, the biasing force of a spring to cause the fork 108 to follow ejection of the film cartridge does not act on a fork 108 during loading of the film cartridge, thereby preventing generation of the load caused by the friction.

Referring to FIGS. 18 and 19, a hole 121a of a disc 121 is fitted on a projection 109 so that the disc 121 is movable at least in a direction indicated by an arrow A and a direction opposite thereto (the disc 121 need not be rotatable on the projection 109). A spring 122 causes a fork 108 to follow ejection of the cartridge. The spring 122 biases the fork 108 through the disc 121 in the direction indicated by the arrow A. An arm portion 117e of a cartridge interlocking lever 117 is located at a position where it is engageable with a collar 121c of the disc 121. Note that the state shown in FIG. 18 indicates that the arm portion 117e of the cartridge interlocking lever 117 is not engaged with the collar 121c. That is, the state in FIG. 18 indicates that an upper surface 121b of the disc 121 shown in FIG. 18 is in contact with the fork 108 and urges the fork 108 to the upper end by using the biasing force of the spring 122.

When the film cartridge is loaded in a cartridge chamber 107, the arm portion 117e of the cartridge interlocking lever 117 is engaged with the collar 121c of the disc 121 and moves the disc 121 downward against the biasing force of the spring 122, as shown in FIG. 19.

A gap L3 is thus formed between the fork 108 and the supply spool 2, so that the fork 8 can be free to vertically move within the gap L3. The biasing force of the spring 120 is not applied to the supply spool 2, and the biasing force of the spring 122 does not act on the fork 108. During loading of the film cartridge, the fork 108 does not receive the biasing force of the spring 120, and an unnecessary friction is not generated. The fork 108 can be rotated by a known film feed gear train.

In each of the fourth to sixth embodiments described above, in an arrangement having a spring for biasing a fork so as to cause the fork to follow ejection of a film cartridge from a cartridge chamber, the biasing force of the spring is not applied to a supply spool through the fork during loading of the film cartridge or closing of the cartridge lid, i.e., at least during film feeding. Therefore, the film cartridge and the fork can be prevented from damage caused by wear of the supply spool and the film cartridge.

As described above, according to each of the fourth to sixth embodiments of the present invention, a releasing means for preventing the biasing force of the biasing means from acting on the supply spool of the film cartridge at least during film feeding is arranged to prevent an unnecessary urging force from acting between the fork and film cartridge. Therefore, damage to the film cartridge and the fork can be prevented.

FIGS. 20 to 27 are views showing the seventh embodiment of the present invention.

Figure 20:
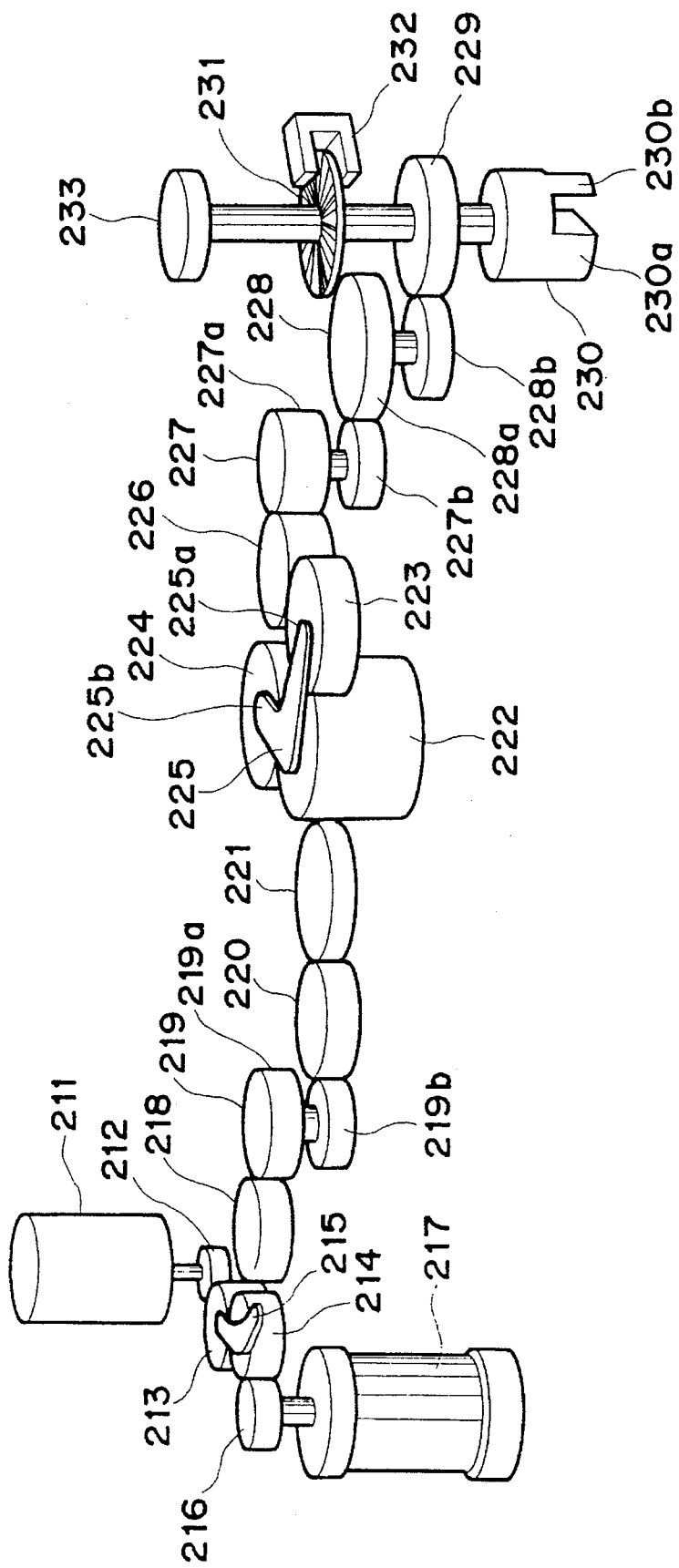
FIG. 20 is a perspective view showing the arrangement of a film feed gear train according to the seventh embodiment of the present invention.
Figure 21:
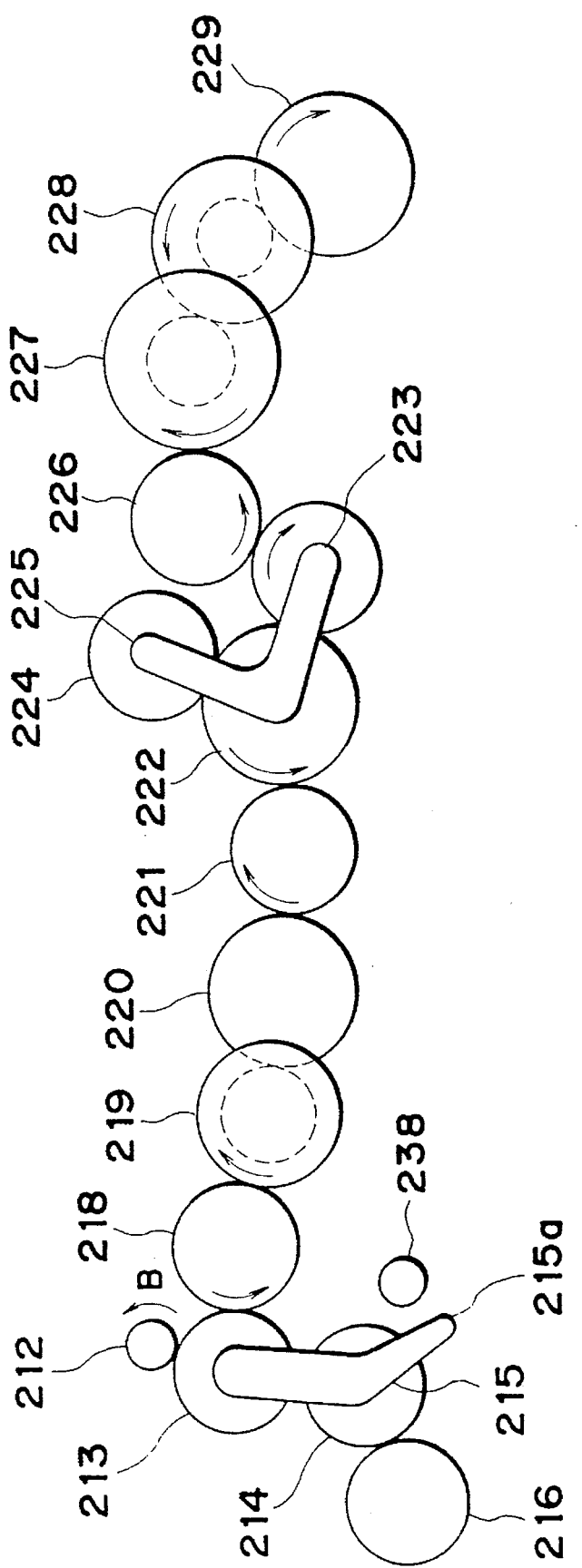
FIG. 21 is a plan view showing a state of the film feed gear train in a film winding mode.
Figure 22:
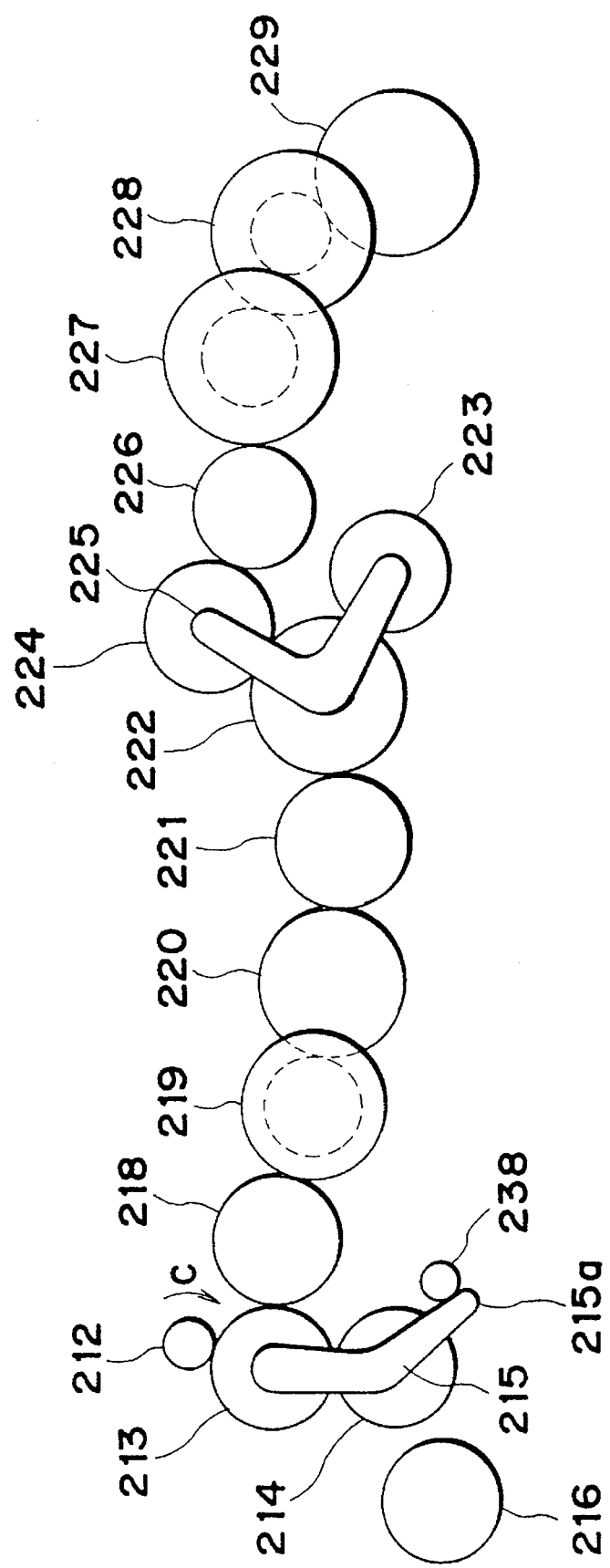
FIG. 22 is a plan view showing a state of the film feed gear train in a film rewinding mode.

FIGS. 20 to 22 are views showing a film feed gear train of a camera. Referring to FIGS. 20 to 22, a film feed motor 211 rotates in the normal direction during film winding (i.e., a direction indicated by an arrow B in FIG. 21) and rotates in the reverse direction during film rewinding (i.e., a direction indicated by an arrow C in FIG. 22). A pinion gear 212 is fixed to the rotating shaft of the motor 211. A first sun gear 213 is meshed with the pinion gear 212. A first planetary gear 214 is meshed with the first sun gear 213. A first connecting lever 215 connects the first sun gear 213 to the first planetary gear 214, rotatably holds the first planetary gear 214 while a friction is generated between the first planetary gear 214 and the first connecting lever 215, and causes the first planetary gear 214 to rotate about the first sun gear 213 upon rotation of the sun gear 213 about its own axis. The first sun gear 213, the first planetary gear 214, and the first connecting lever 215 constitute a known planetary gear mechanism. A spool gear 216 is meshed with the first planetary gear 214 only when the film feed motor 211 rotates in the formal direction. A take-up spool 217 is fixed to the spool gear 216 and is moved together with the spool gear 216.

A first idler gear 218 is always meshed with the first sun gear 213. A first two-step gear 219 has a large gear portion 219a and a small gear portion 219b, so that the large gear portion 219a is meshed with the first idler gear 218. A second idler gear 220 is meshed with the small gear portion 219b of the first two-step gear 219. A third idler gear 221 is meshed with the second idler gear 220. A second sun gear 222 is meshed with the third idler gear 221. A second planetary gear 223 is meshed with the second sun gear 222. A third planetary gear 224 is meshed with the second sun gear 222 in the same manner as in the second planetary gear 223. A second connecting lever 225 causes its arm portions 225a and 225b to connect the second sum gear 222 to the second and third planetary gears 223 and 224, rotatably holds the respective planetary gears while causing to generate frictions, and causes the second and third planetary gears 223 and 224 to rotate about the second sun gear 222 upon rotation of the second sun gear 222 about its own axis. The second sun gear 222, the second and third planetary gears 223 and 224, and the second connecting lever 225 constitute a known planetary gear mechanism.

A fourth idler gear 226 is meshed with the second planetary gear 223 and is not meshed with the third planetary gear 222 upon counterclockwise rotation of the second connecting lever 225 about the second sun gear 222 in the formal rotation of the film feed motor 211. However, in the reverse rotation of the motor 211, the fourth idler gear 226 is meshed with the third planetary gear but is not meshed with the second planetary gear 223 upon clockwise rotation of the second connecting lever 225. A second two-step gear 227 has a large gear portion 227a and a small gear portion 228b. The large gear portion 227a is meshed with the fourth idler gear 226. A third two-step gear 228 has a large gear portion 228a and small gear portion 228b, and the large gear portion 228a is meshed with the small gear portion 227b of the second two-step gear 227. A fork gear 229 is meshed with a small gear portion 228b of the third two-step gear 228. A fork 230 is rotated together with the fork gear 229. A portion 230a of the fork 230 is engaged with a spline 2a2 of the supply spool 2 of the film cartridge (FIG. 31), and a portion 230b is engaged with a spline 2a1. Therefore, the supply spool 2 in the film cartridge is rotated to supply or rewind a film 4 to or from the cartridge.

A pulse disc 231 is rotated together with the fork gear 229 and has transparent and non-transparent portions alternately formed in the circumferential direction thereof. A photosensor 232 detects the rotational position of the pulse disc 231. A lock disc 233 is rotated together with the fork gear 229.

The lock disc 233 is set in a locked or non-locked state by a means shown in FIGS. 7 and 8.

Figure 23:
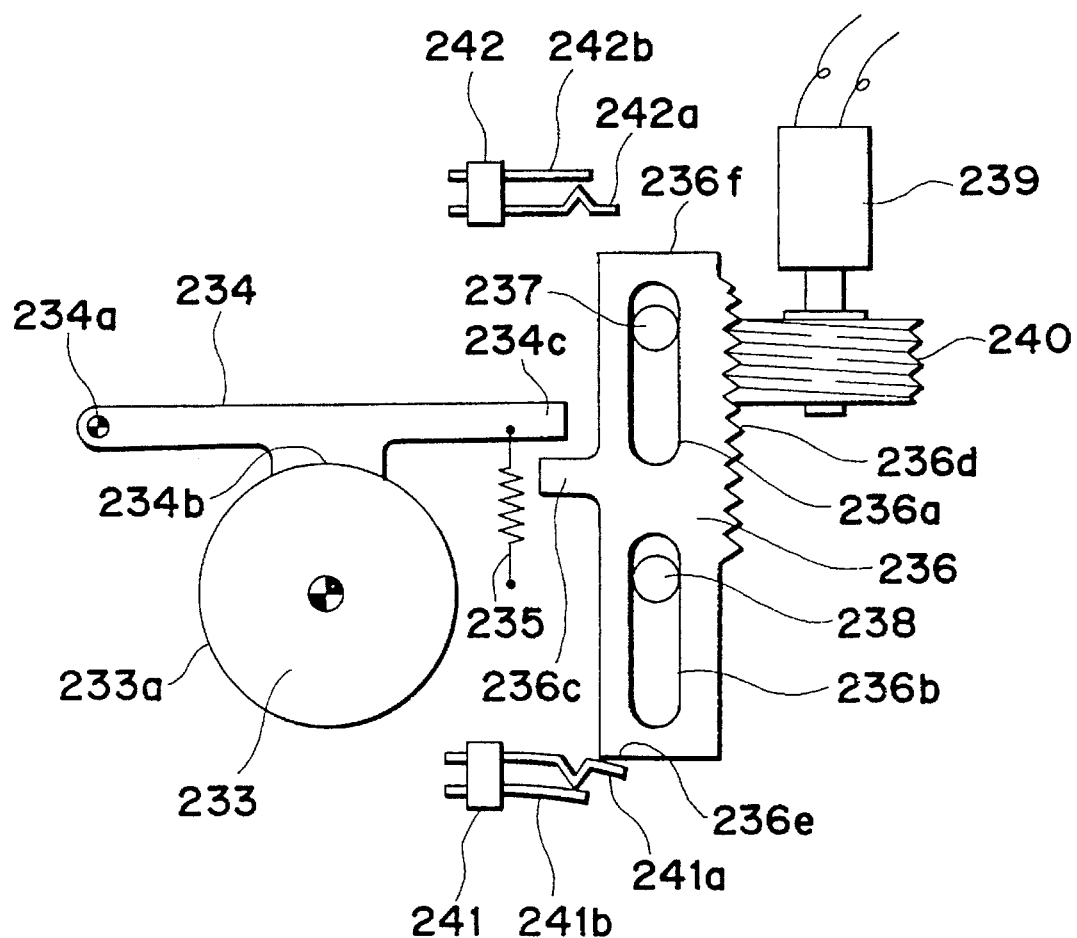
FIG. 23 is a plan view showing the structure of a peripheral portion of a lock disc shown in FIG. 20.

FIG. 23 is a view showing the locked state of the lock disc 233.

Referring to FIG. 23, a lock lever 234 is mounted on a camera body (not shown) to be pivotal about a shaft 234a.

A portion 234b of the lock lever 234 can be brought into contact with a peripheral portion 233a of the lock disc 233. One end of a spring 235 is fixed to the camera body (not shown), and the other end of the spring 235 is fixed to the lock lever 234. The spring 235 applies a biasing force to the lock lever 234 in the clockwise direction. A release lever 236 is slidable on the camera body (not shown) such that projections 237 and 238 formed on the camera body (not shown) are respectively fitted in elongated holes 236a and 236b of the release lever 236. Although an arm portion 236c of the release lever 236 can be engaged with an arm portion 234c of the lock lever 234, the arm portion 236c is not engaged therewith in the state shown in FIG. 23.

In the state shown in FIG. 23, the portion 234b of the lock lever 234 urges the peripheral portion 233a of the lock disc 233 by means of the biasing force of the spring 235, thereby generating the friction to lock the rotation of the lock disc 233.

A lever driving motor 239 is a reversible motor. A worm wheel 240 is fixed on the output shaft of the motor 239. The worm wheel 240 is meshed with a rack portion 236d of the release lever 236. The release lever 236 is moved upward in FIG. 23 upon normal rotation of the lever driving motor 239, and is moved downward upon reverse rotation of the lever driving motor 239.

Contact pieces 241a and 242a of switches 241 and 242 are deformed upon contact with end portions 236e and 236f of the release lever 236, so that the contact pieces 241a and 242a are respectively brought into contact with contact pieces 241b and 242b to turn on the switches 241 and 242. The switch 241 is used to inhibit further reverse rotation of the lever driving motor 239 (upon ON operation). The switch 242 is used to inhibit further normal rotation of the lever driving motor 239 (upon ON operation).

When the lever driving motor 239 rotates in the normal direction in the state in FIG. 23, the release lever 236 is moved upward, its arm portion 236c is engaged with the arm portion 234c of the lock lever 234, and the lock lever 234 is rotated counterclockwise against the biasing force of the release lever 236. The switch 242 is turned on by the end portion 236f of the release lever 236. In this case, since the contact piece 241a of the switch 241 is released from the end portion 236e of the release lever 236, the switch 241 is set in an OFF state.

As a result, the portion 234b of the lock lever 234 is kept separated from the peripheral portion 233a of the lock disc 233, and the lock disc 233 is kept in an non-engaged state. This state is shown in FIG. 24.

Figure 24:
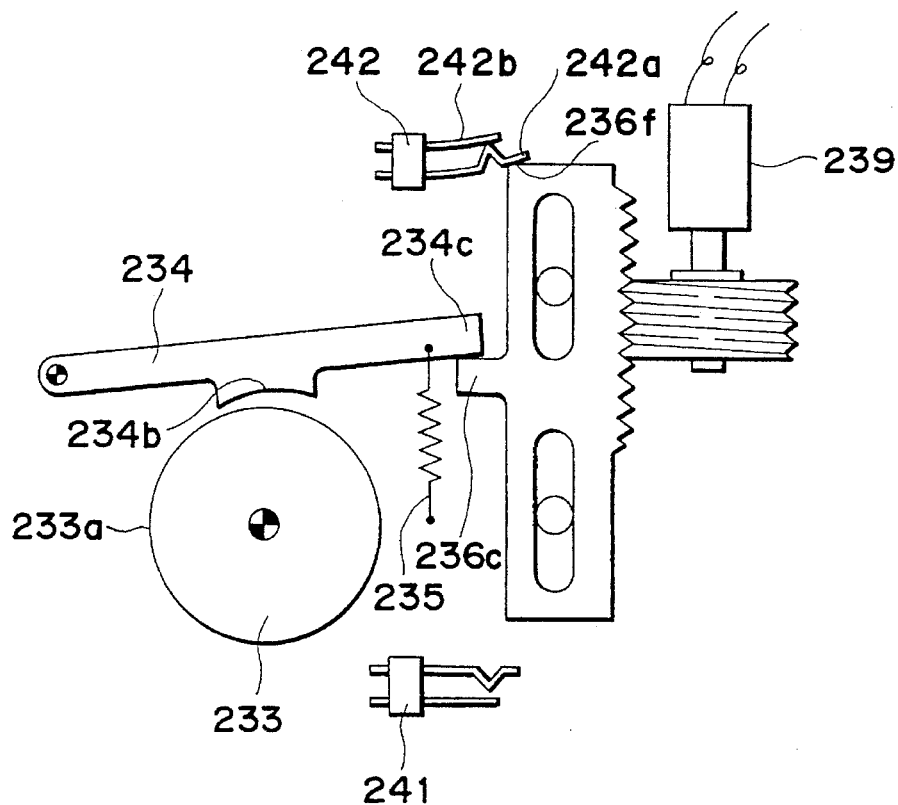
FIG. 24 is a plan view showing states of the respective portions when a rotation lock state of the lock disc is released.

The lock disc 233 is set in the non-engaged state at least during film feeding, as shown in FIG. 24.

When the film cartridge shown in FIGS. 38 and 39 is used, cumbersome operations such as setting of the leading end of the film at a predetermined position need not be performed upon loading of the film in the camera. Until a supply spool 2 of the film is rotated by a fork 230 to feed a film 4 and the film 4 is wound around a take-up spool 217, the film 4 is fed. Thereafter, the film 4 is fed by the film take-up spool 217.

In the above arrangement, when the pinion gear 212 (film feed motor 211) is rotated in a direction indicated by an arrow B (in the normal direction), as shown in FIG. 21, upon loading of the film cartridge into a cartridge chamber (not shown), the first sun gear 213 is rotated clockwise. The first planetary gear 214 is rotated clockwise about the first sun gear 213 by the behavior of the first connecting lever 215 and is then meshed with the spool gear 216. The driving force of the film feed motor 211 is transmitted to the spool gear 216, and the film take-up spool 217 is rotated clockwise.

The driving force through the idler gear 218 as another gear meshed with the first sun gear 213 is transmitted to the second sun gear 222 through the first two-step gear 219, the second idler gear 220, and the third idler gear 221. Since the second sun gear 222 is rotated counterclockwise, the second and third planetary gears 223 and 224 are rotated counterclockwise about the second sun gear 222 by the behavior of the second connecting lever 225. The second planetary gear 223 is then meshed with the fourth idler gear 226, so that the driving force from the film feed motor 211 in the direction indicated by the arrow B is transmitted as a counterclockwise driving force to the fourth idler gear 226. This driving force is further transmitted to the fork gear 229 through the second and third two-step gears 227 and 228. As a result, the fork 230 is rotated clockwise.

The gear ratio of the gear train is determined as follows.

If the peripheral speed of the film take-up spool 217 is defined as V1 and the speed of the film 4 fed from the film cartridge by means of the fork 230 is defined as V2, condition V1>V2 is established.

When the film 4 is fed from the film cartridge upon clockwise rotation of the fork 230, the leading end of the film 4 is wound around the film take-up spool 217. Thereafter, the film 4 is wound upon rotation of the film take-up spool 217 by means of the film feed motor 211 due to the following reason.

When the film 4 is wound around the film take-up spool 217, the driving force of the film take-up spool 217 is transmitted in an order of the fork gear 229, the third two-step gear 227, and the fourth idler gear 226 through the film 4. The counterclockwise rotational speed of the fourth idler gear 226 is higher than the clockwise rotational speed of the second planetary gear 223. In this case, however, the fourth idler gear 226 repels the second planetary gear 223 to temporarily disengage the second planetary gear 223 from the fourth idler gear 226, thereby absorbing the speed difference.

The feeding speed of the film 4 is changed from V2 kept until the film 4 is wound around the film take-up spool 217 to V1. Note that a known means (e.g., perforations of the film 4 are hooked by a gripper formed on the film take-up spool 217 or a roller plate, mounted on the camera body, for urging the film 4 against the film take-up spool 7) is used as a method of winding the film 4 around the film take-up spool 217.

A film rewinding operation will be described below.

This operation will be described with reference to FIG. 22. When the film feed motor 211 rotates in a direction indicated by an arrow C in FIG. 22, the first connecting lever 215 and the first planetary gear 214 are rotated counterclockwise about the first sun gear 213 until an end portion 215a of the first connecting lever 215 abuts against a stopper 238. Therefore, the first planetary gear 214 is disengaged from the spool gear 216.

At this time, the second sun gear 222 is rotated clockwise, so that the third planetary gear 224 is rotated clockwise about the second sun gear 222 by the behavior of the second connecting lever 225. The fourth idler gear 226 is disengaged from the second planetary gear 223, and instead, the fourth idler gear 226 is meshed with the third planetary gear 224. Therefore, the fork gear 229 is rotated counterclockwise, the supply spool 2 in the film cartridge is rotated in the reverse direction by the fork 230, and the film 4 is rewound into the cartridge.

The structure of the pulse disc 231 shown in FIG. 20 will be described with reference to the plan view of FIG. 25.

Figure 25:
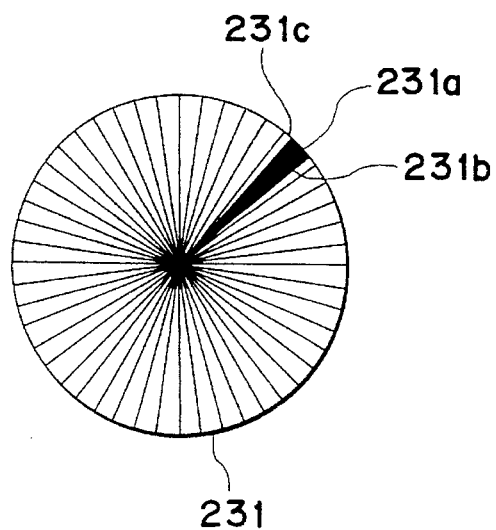
FIG. 25 is a plan view of a pulse disc shown in FIG. 20.

Referring to FIG. 25, a reference signal portion 231a is a non-transparent portion for detecting a reference position of the pulse disc 231. The reference signal portion 231a is wider than each of adjacent transparent portions 231c and 231b. The photosensor 232 discriminates the reference signal portion 231a.

The photosensor 232 optically counts pulses from the reference signal portion 231a upon rotation of the pulse disc 233, thereby detecting a rotation amount (position) of the pulse disc 231.

The rewinding operation of the film 4 into the cartridge is stopped when the angular position of the supply spool 2 is located to indicate the number of frames actually photographed. The pulse disc 231 is used in this positioning.

Figure 26:
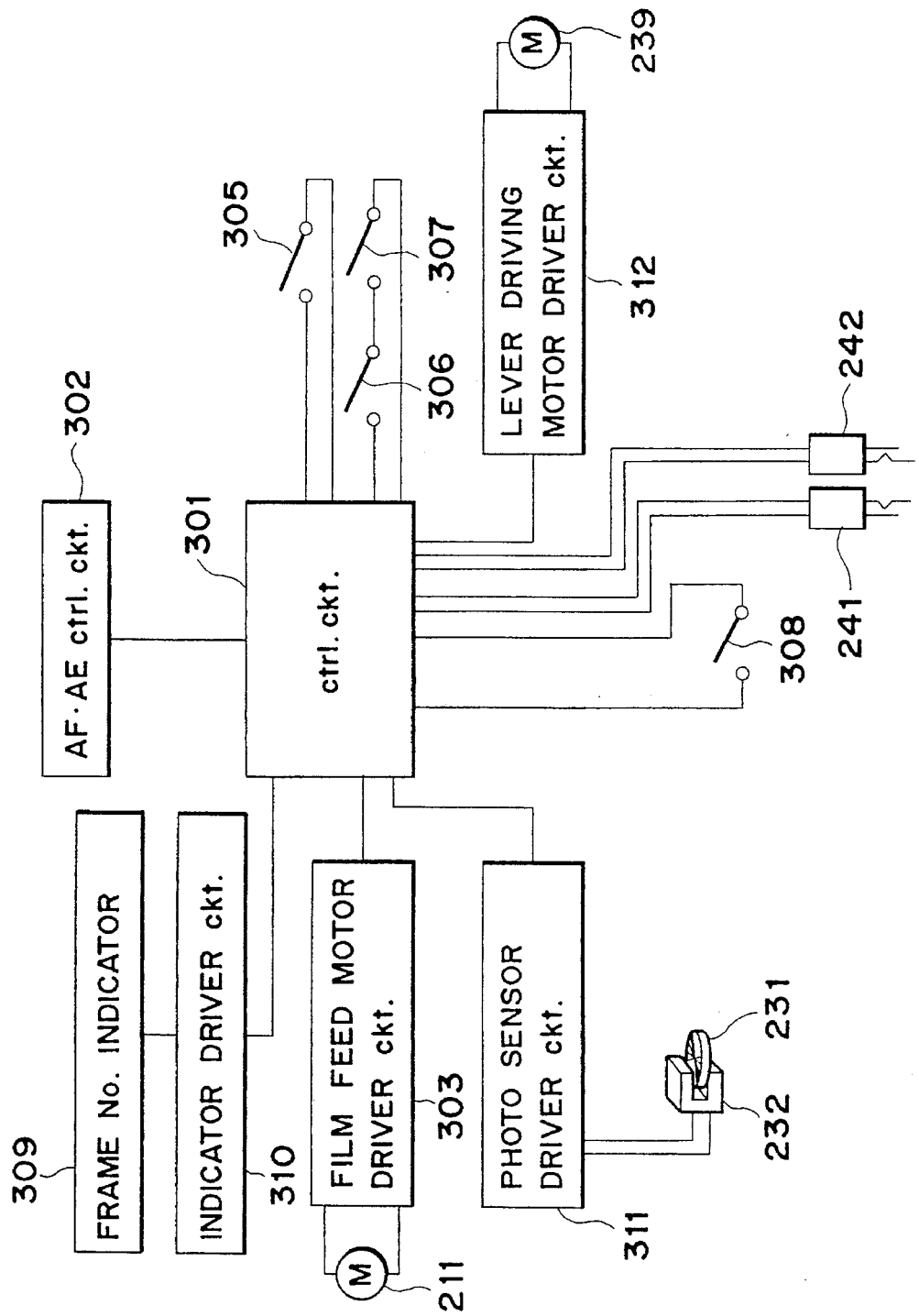
FIG. 26 is a block diagram showing an electrical arrangement of a camera according to the seventh embodiment of the present invention.

FIG. 26 is a block diagram of an electrical circuit of the camera having the above film feed gear train.

Referring to FIG. 26, a control circuit 301 includes a microcomputer to control various operations of the camera. An AF·AE control circuit 302 controls the focus operation of a photographing lens and the operation of an exposure control shutter. A film feed motor driving circuit 303 drives the film feed motor 211. A release switch 305 is turned on to perform a release operation of the camera. A switch 306 is turned on when a film cartridge (not shown) is loaded in the camera. A switch 307 is turned on when the rear lid is closed. When both the switches 306 and 307 are turned on, the control circuit 301 drives the film feed motor driver circuit 301 after the control circuit 301 detects the ON state of a switch 242, thereby starting positioning of the first frame of the film. A switch 308 initiates rewinding from the intermediate portion of the film.

A frame No. indicator 309 indicates the number of frames of the film and comprises a liquid crystal display unit. An indicator driver circuit 310 drives the frame No. indicator 309 to cause it to perform a count-up or count-down operation. A photosensor driver circuit 311 drives the photosensor 232. The photosensor 232 detects the rotation amount of the pulse disc 231, and a detection signal from the photosensor 232 is output to the control circuit 301. A lever driving motor driver circuit 312 drives the lever driving motor 239.

Figure 27:
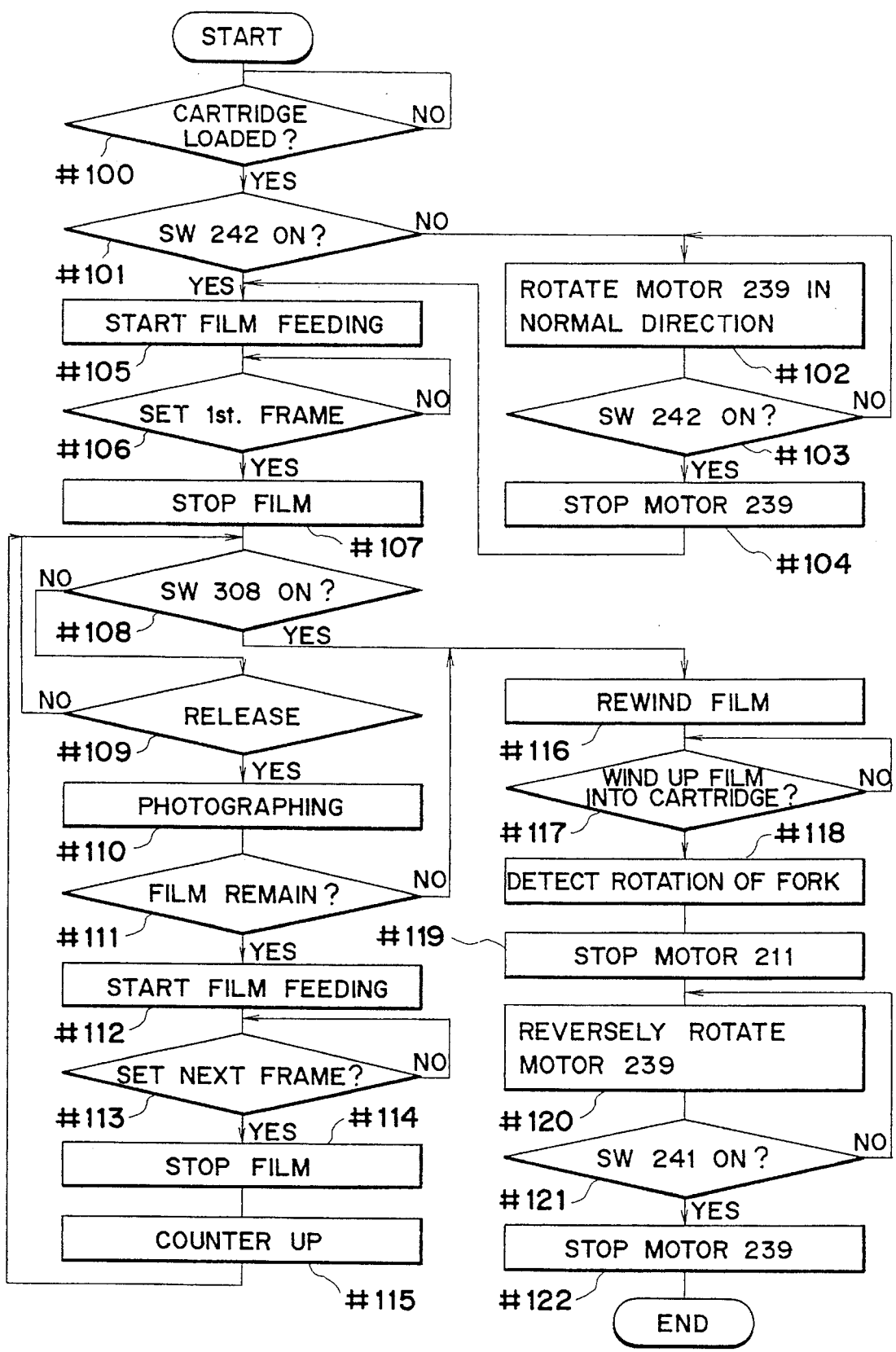
FIG. 27 is a flow chart showing an operation of a control circuit.

An operation of the control circuit 301 will be described with reference to a flow chart in FIG. 27.

"Step 100": It is determined whether both the cartridge loading switch 306 and the rear lid switch 307 are turned on. If YES in step 100, it is determined that the film cartridge is loaded in the camera and the rear lid is closed, and the flow advances to step 101.

"Step 101": It is determined whether the switch 242 is turned on. If YES in step 101, since the lock disc 233 is not locked by the lock lever 234, i.e., since the state in FIG. 24 is set, the flow advances to step 105. Otherwise, the flow advances to step 102.

"Step 102": The lever driving motor 239 is driven through the lever driving motor driver circuit 312 in the normal direction.

"Step 103": It is determined whether the switch 242 is turned on. If YES in step 103, the flow advances to step 104.

"Step 104": The lever driving motor 239 is stopped through the lever driving motor driver circuit 312.

"Step 105": The film feed motor driver circuit 303 is operated to locate the first frame of the film 4 at a position corresponding to the aperture portion, i.e., to start positioning of the first frame.

"Step 106": When completion of positioning of the first frame of the film 4 is detected by a known means (e.g., film feed amount detection by an encoder, detection of a motor energization time, or detection of the number of perforations by a photosensor (not shown)), the flow advances to step 107.

"Step 107": Driving of the film feed motor driver circuit 303 is stopped to stop the film feed motor 211. In addition, the indicator driver circuit 310 is driven to indicate the first frame on the frame No. indicator 309.

"Step 108": It is determined whether the switch 308 is kept on or off. If the switch 308 is determined to be ON, it is determined that rewinding from the intermediate portion of the film is performed. The flow advances to step 116. If the switch 308 is determined to be OFF, the flow advances to step 109.

"Step 109": The state of the release switch 305 is determined. If the release switch 305 is determined to be ON, it is determined that the release operation has been performed. The flow advances to step 110. At the same time, the number of release operations is stored every time the release operation is performed.

"Step 110": The AF·AE control circuit 302 is driven to perform a photographing operation such as focusing of the photographing lens or an exposure operation by opening/closing of the shutter.

"Step 111": The number of frames to be photographed, preset by a known means, is compared with the number of photographed frames to determine whether a film remains. If YES in step 111, the flow advances to step 112. Otherwise, the flow advances to step 116.

"Step 112": The film feed motor driver circuit 303 is driven to start film winding for the next frame.

"Step 113": When completion of film winding for the next frame of the film 4 by a predetermined length is detected by a method of causing a photosensor (not shown) to count perforations of the film 4 or a method of detecting a rotation amount of a sprocket engaged with the perforation, the flow advances to step 114.

"Step 114": Film feeding is stopped through the film feed motor driver circuit 303.

"Step 115": The indicator driver circuit 310 is driven to advance the number of frames indicated on the frame No. indicator 309 by one. The flow then returns to step 108.

Operations from step 116 upon completion of step 108 or 111 will be described below.

"Step 116": The film feed motor driver circuit 303 is driven to drive the film feed motor 211 in the film rewinding direction to start rewinding of the film into the film cartridge.

"Step 117": When film rewinding of the entire film 4 into the film cartridge is detected in accordance with a known means, e.g., a method of detecting that the leading end of the film has passed using a photosensor (not shown) or a method of detecting rewinding of the film 4 into the film cartridge upon a lapse of a predetermined period of time in the film rewinding operation, the flow advances to step 114.

"Step 118": The angular position of the fork 230 and the angular position of the pulse disc 231 are detected by the photosensor 232 to detect that an index portion 2b of the supply spool 2 of the film cartridge reaches the position of the same number of frames as that indicated on the frame No. indicator 309. The flow then advances to step 119.

"Step 119": The operation of the fork 230 is immediately stopped through the film feed motor driver circuit 303.

The number of frames to be positioned at the time of loading of the next film in the camera is indicated in the film cartridge by the index portion 2b and the indicator 1b.

"Step 120": After the use state of the film is indicated as described above, the lever driving motor 239 is rotated in the reverse direction through the lever drive motor driver circuit 312. The release lever 236 is moved downward in FIG. 24.

"Step 121": When the switch 241 is turned on by the release lever 236, the flow advances to step 122.

"Step 122": The lever driving motor 239 is immediately stopped through the film feed motor driver circuit 303.

In this state, as shown in FIG. 23, the lock disc 233 is locked by the lock lever 234. Even if an impact such as dropping of the camera is applied to the camera, the fork 230 will not be rotated, and an accident in which the number of frames of the supply spool 2 of the film cartridge is changed will not occur, thereby completing a camera sequence.

Figure 28:
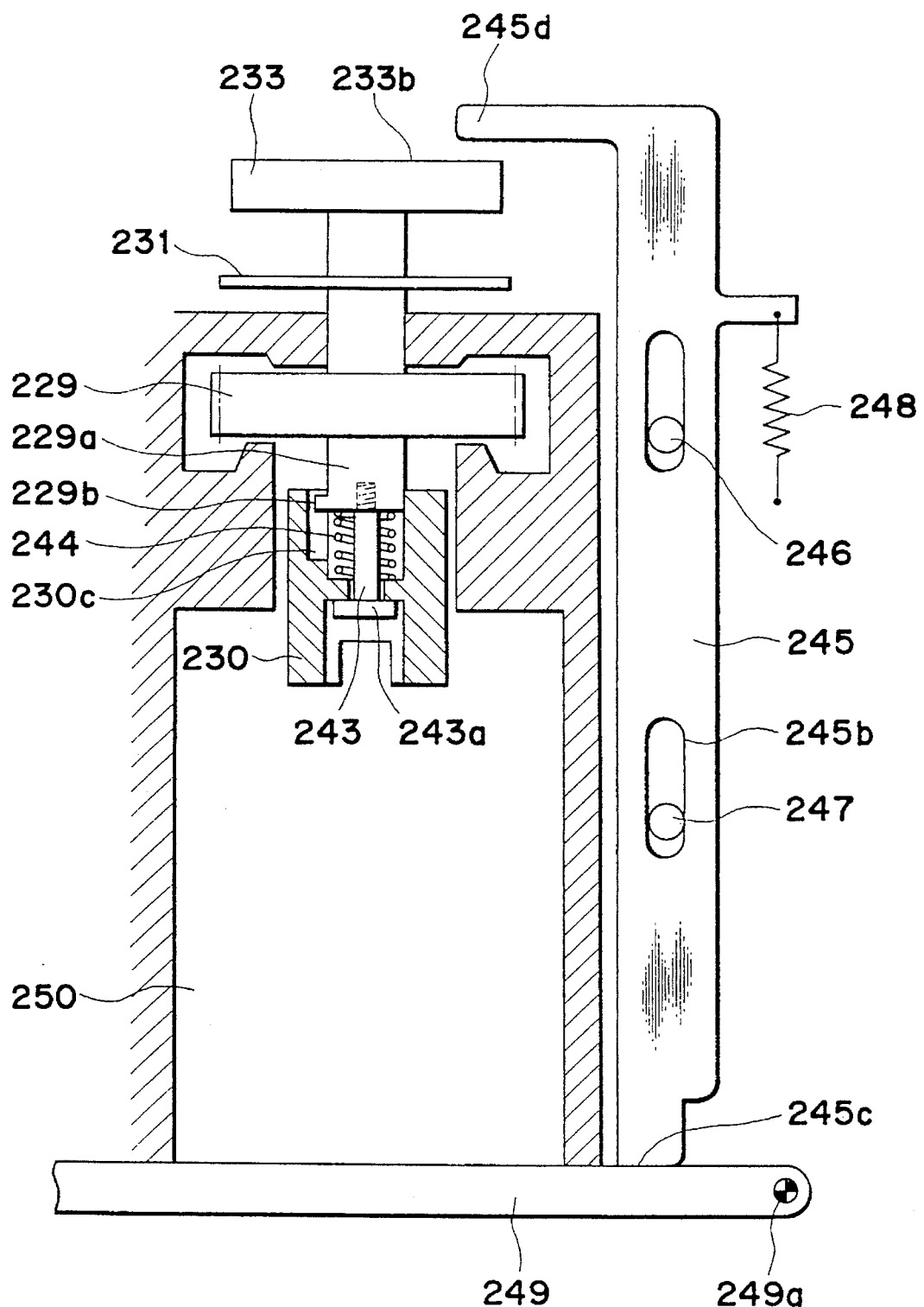
FIG. 28 is a sectional view showing the main part of a camera according to the eighth embodiment of the present invention.
Figure 29:
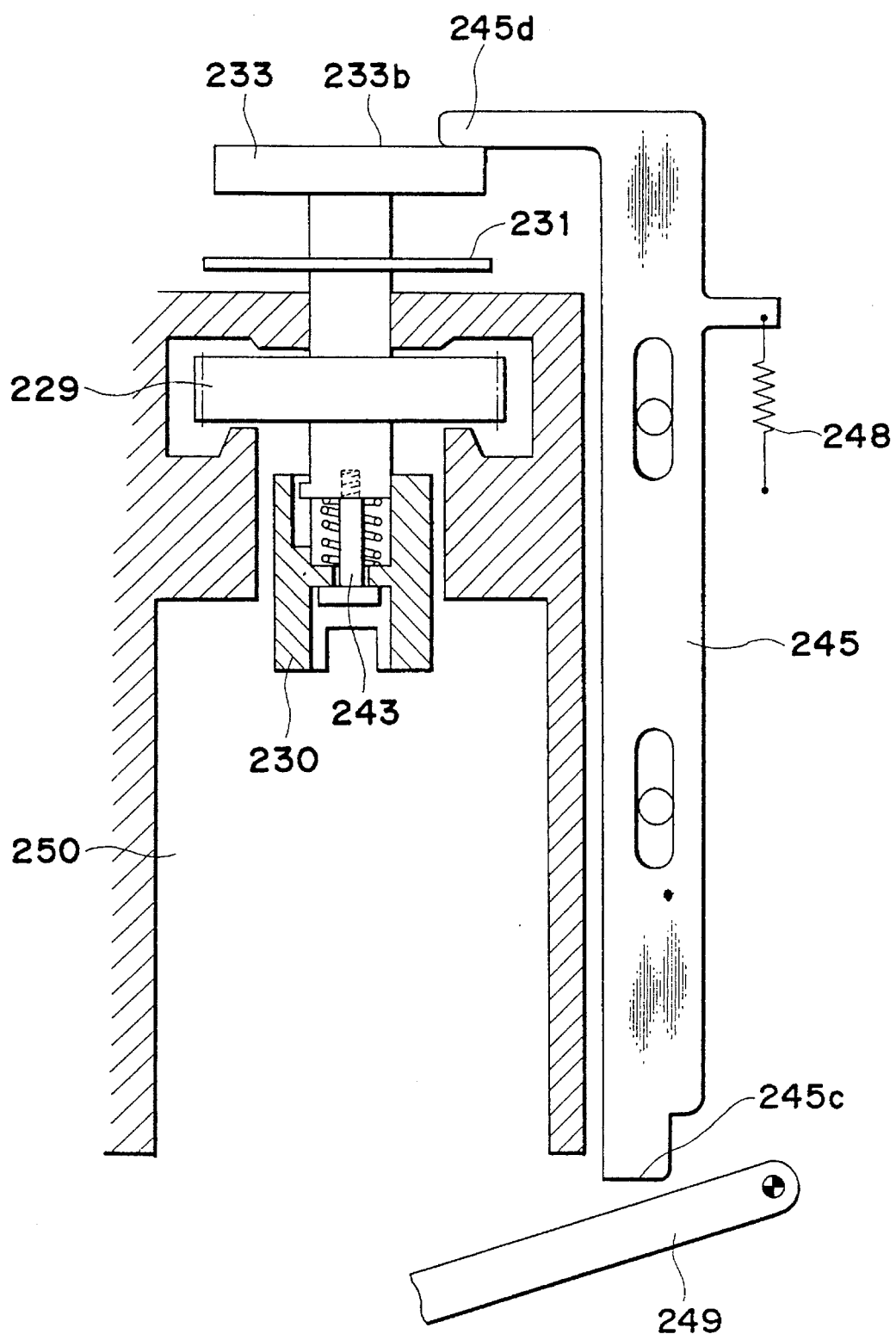
FIG. 29 is a sectional view showing a state in which a cartridge lid is opened from the state shown in FIG. 28.

FIGS. 28 and 29 are views according to the eighth embodiment of the present invention.

Upon completion of a photographing operation, a film 4 is rewound into a film cartridge, and a supply spool 2 is rotated to a position representing the use state of the film 4. From the start of ejecting the film cartridge from a cartridge chamber until rotation of the supply spool 2 is stopped, a fork 230 may be accidentally rotated by a disturbance in the following cases. This accidental rotation of the fork 230 may occur when a user touches the film cartridge to remove the film cartridge from the cartridge chamber or when an impact is applied to the camera to remove the film cartridge.

In the eighth embodiment, when the cartridge chamber lid is opened to eject the film cartridge from the cartridge chamber, rotation of the fork 230 is locked.

Referring to FIG. 28, a stepped screw 243 is mounted in a shaft 229a of a fork gear 229, and a head portion 243a of the stepped screw 243 regulates the lower position of the fork 230. A compression spring 244 acts between the fork gear 229 and the fork 230 to bias the fork 230 downward.

The fork 230 is fitted on the shaft 229a of the fork gear 229 to be vertically movable. A projection 229b formed on the shaft 229a is fitted in a groove 230c of the fork 230, so that the fork 230 is rotated together with the fork gear 229.

A cartridge lid interlocking lever 245 is slidable so that projections 246 and 247 of a camera body (not shown) are respectively fitted in elongated holes 245a and 245b of the cartridge lid interlocking lever 245. One end of a spring 248 is fixed to the camera body, and the other end of the spring 248 is fixed to the cartridge lid interlocking lever 245. The spring 245 biases the cartridge lid interlocking lever 245 downward. A cartridge chamber lid 249 is mounted in the camera body (not shown) to be pivotal about a shaft 249a. A cartridge chamber 250 is formed to receive a cartridge.

In the above structure, when the cartridge chamber lid 249 is kept closed, as shown in FIG. 28, an end portion 245c of the cartridge lid interlocking lever 245 abuts against the cartridge chamber lid 249 and is kept urged upward against the biasing force of the spring 248. An arm portion 245d of the lever 245 is kept separated from an upper surface 233b of a lock disc 233.

The lock disc 233 is kept in a non-locked state, and the fork gear 229 can be rotated by the film feed gear train shown in FIG. 20.

The film cartridge is loaded in the cartridge chamber 250, and photographing is performed. The film 4 is then rewound into the film cartridge, and the supply spool 2 is rotated to a position representing the use state of the film 4. The camera is stopped, and the film cartridge is removed from the cartridge chamber 250. At this time, when the cartridge chamber lid 249 is opened, the cartridge chamber lid 249 is released from the end portion 245c of the cartridge lid interlocking lever 245. The cartridge lid interlocking lever 245 is moved downward by the biasing force of the spring 248, and the arm portion 245d of the lever 245 urges the upper surface 233b of the lock disc 233, thereby locking the lock disc 233. This state is shown in FIG. 29.

In this state, the fork 230 is not rotated even with an impact or the like. The number of frames as the use state of the film 4 will not be shifted.

Figure 30:
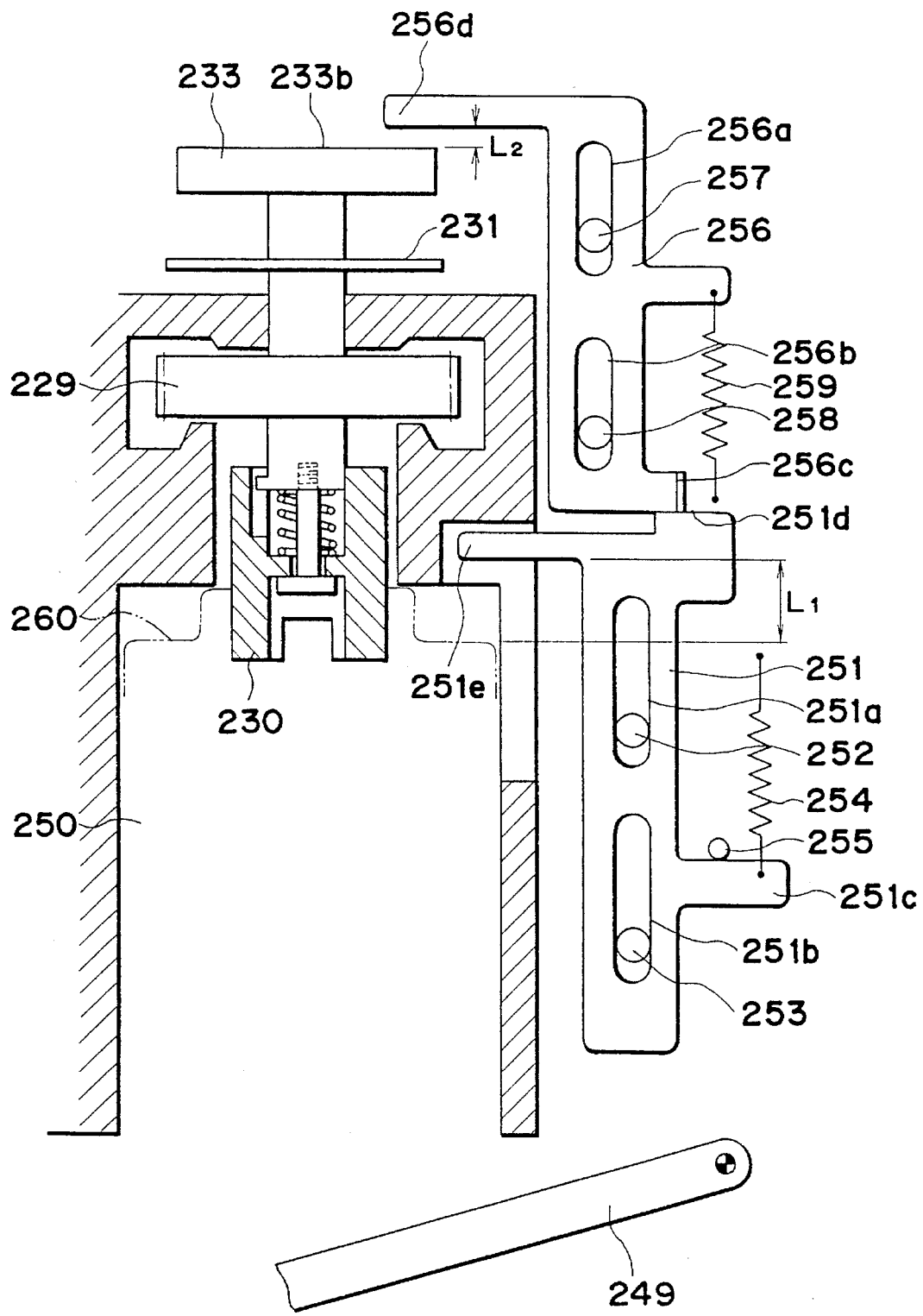
FIG. 30 is a sectional view showing the main part of a camera according to the ninth embodiment of the present invention.

FIG. 30 is a view according to the ninth embodiment of the present invention.

In this embodiment, rotation of a fork 230 is locked in synchronism with the operation of the ejector of a film cartridge due to the same reason as in the eighth embodiment.

Referring to FIG. 30, an ejector lever 251 is slidable such that projections 252 and 253 on a camera body (not shown) are respectively fitted in elongated holes 251a and 251b of the ejector lever 251. This ejector lever 251 can be used by a user. One end of a spring 254 is fixed to the camera body, and the other end of the spring 254 is fixed to the ejector lever 251. The spring 254 biases the ejector lever 251 upward in FIG. 30. The biasing force of the spring 254 is defined as F1. A stopper 255 can be engaged with an arm portion 251c of the ejector lever 251 to regulate the upper position of the ejector lever 251. The stopper 255 is mounted in the camera body (not shown).

An eject interlocking lever 256 is slidable such that projections 257 and 258 formed in the camera body (not shown) are respectively fitted in elongated holes 256a and 256b, respectively. An upright portion 256c of the lever 256 can be brought into contact with an end portion 251d of the ejector lever 251. One end of a spring 259 is fixed to the camera body, and the other end of the spring 259 is fixed to the eject interlocking lever 256. The spring 259 biases the eject interlocking lever 256 downward. The biasing force of the spring 259 is defined as F2.

A relationship between the biasing force F2 of the spring 259 and the biasing force F1 of the spring 254 satisfies condition F1>F2. Therefore, the eject interlocking lever 256 is kept at the upper position together with the ejector lever 251 by the biasing force of the spring 254. This state is shown in FIG. 30.

A film cartridge 260 is mounted in the above structure.

In the state shown in FIG. 30, an arm portion 256d of the eject interlocking lever 256 has a gap L2 with an upper surface 233b of the lock disc 233. The fork 230, a fork gear 229, and the like can be rotated by a film feed gear train. On the other hand, an arm portion 251e of the eject lever 251 can be engaged with the film cartridge 260. However, in the state shown in FIG. 30, a gap L1 is set. The ejector lever 251 is not in contact with the film cartridge 260. That is, condition L1>L2 is established.

In order to eject the film cartridge 260 from a cartridge chamber 250, the user moves the ejector lever 251 downward against the biasing force of the spring 254. The eject interlocking lever 256 is moved downward by the biasing force of the spring 259. The arm portion 256d urges the upper surface 233b of the lock disc 233 by the biasing force of the spring 259 before the arm portion 251e of the ejector lever 251 is brought into contact with the film cartridge 260. Therefore, even if an impact or the like acts on the fork 230, it is not accidentally rotated.

The arm portion 251e of the ejector lever 251 is brought into contact with the film cartridge 260 in the subsequent stroke. The film cartridge 260 is moved downward in FIG. 30, i.e., it is moved outside the cartridge chamber 250. Therefore, the film cartridge 260 can be removed from the cartridge chamber 250.

With this structure, when the film cartridge 260 is to be removed from the cartridge chamber 250 by the ejector lever 251, the fork 230 and a supply spool 2 in the film cartridge 260 will not be rotated even if any disturbance acts thereon.

According to each of the seventh to ninth embodiments described above, there is provided a means, operated after a supply spool is rotated to a position indicating the use state of a film, for locking rotation of the fork. Even if a disturbance or impact acts from the start of ejection of the film cartridge from the cartridge chamber until ejection of the cartridge is completed, the supply spool will not be accidentally rotated. Therefore, the indication representing the use state of the film will not be erroneously performed.

According to each of the seventh to ninth embodiments described above, there are arranged a locking means, the state of which is changed between a first state in which rotation of a fork is locked and a second state in which rotation of the fork is not locked, and a lock control means for switching the locking means from the second state to the first state after a state of use of the film is indicated on an indicating means upon completion of film rewinding into a film cartridge.

There are also provided a locking means, the state of which is changed between a first state in which rotation of a fork is locked and a second state in which rotation of the fork is not locked, and a lock control means for switching the locking means from the second state to the first state in synchronism with ejection of the film cartridge from the cartridge chamber by the user, which ejection is performed after a state of use of the film is indicated on an indicating means upon completion of film rewinding into a film cartridge.

After the use state of the film is indicated on the indicating means upon completion of film rewinding into the film cartridge, the locking means is switched from the second state to the first state, i.e., the fork is locked by the locking means until rotation of the supply spool is inhibited by at least a rotation inhibiting means. Therefore, accidental rotation of the supply spool is prevented.

The erroneous indication of the use state of the film on the indicating means can be prevented.

FIGS. 31 to 36 are views according to the tenth embodiment of the present invention.

Figure 31:
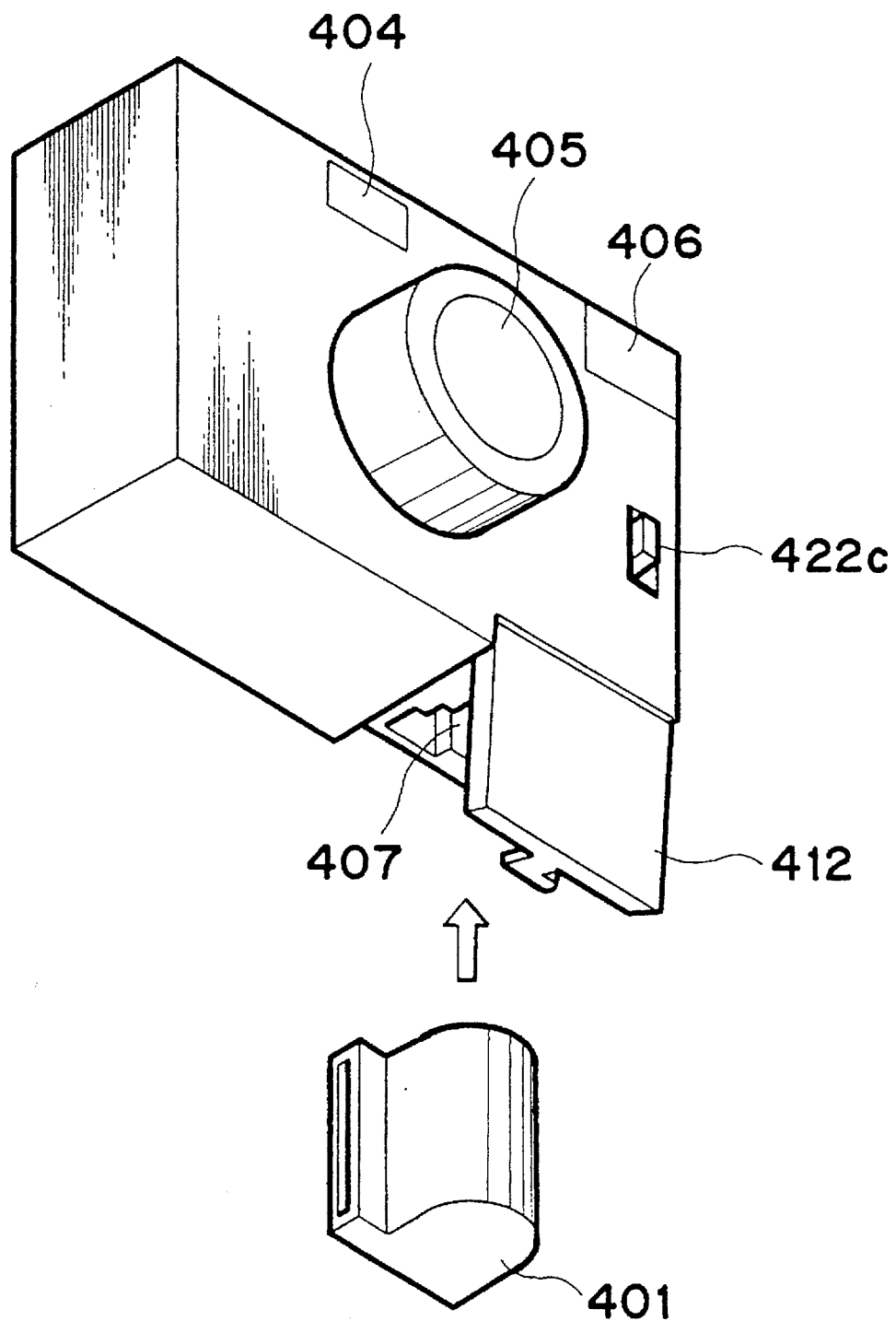
FIG. 31 is a perspective view showing a camera and a film cartridge used therein according to the tenth embodiment of the present invention.
Figure 32:
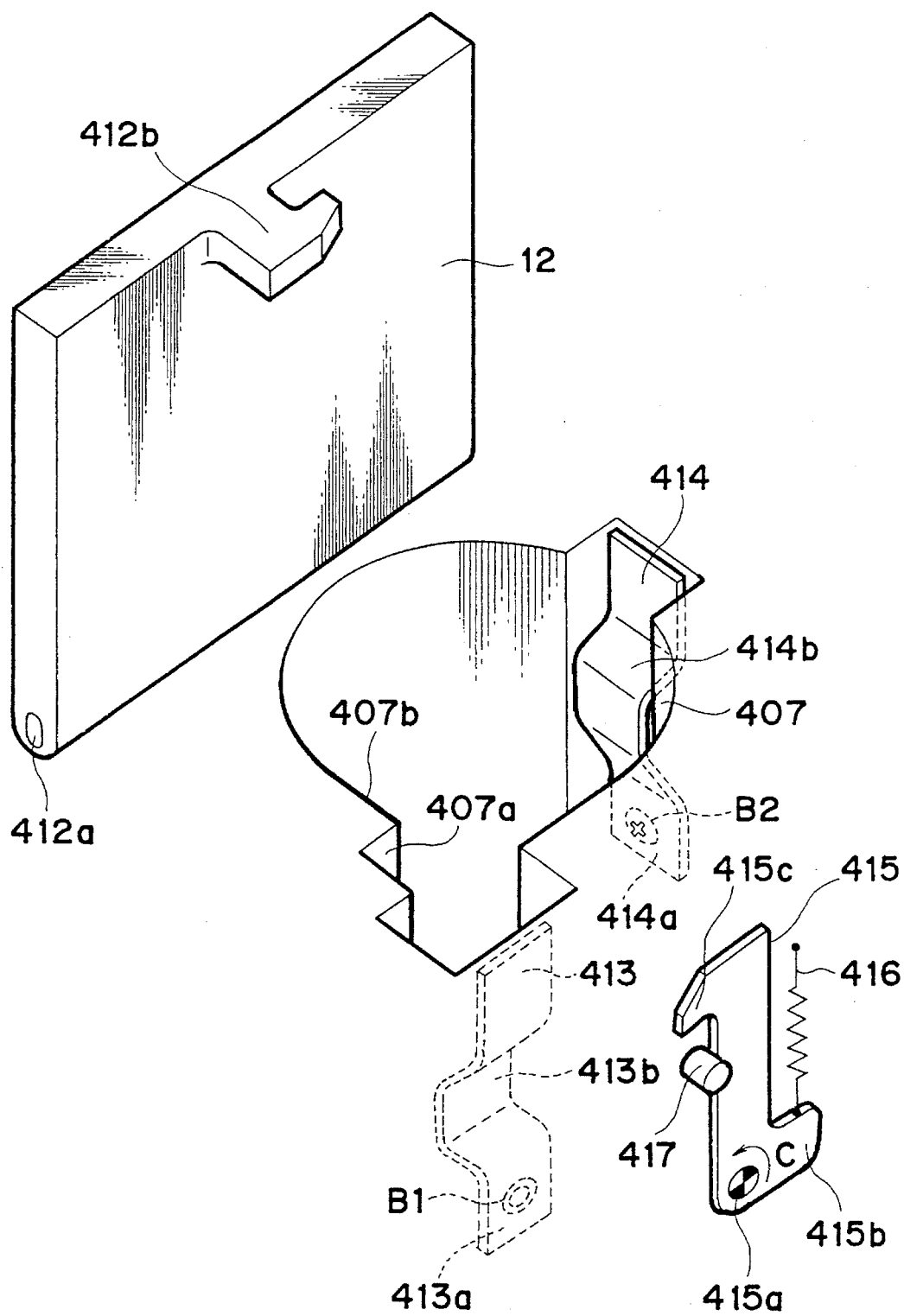
FIG. 32 is a perspective view showing a cartridge chamber and its vicinity of the camera shown in FIG. 31.

FIG. 31 is a perspective view showing the bottom surface of a camera, and FIG. 32 is a view showing a cartridge chamber in detail.

A film cartridge 401 is proposed in U.S. Pat. No. 4,834,306 and is arranged as follows.

This film cartridge comprises a film passing slit, a film which has one end fixed to a supply spool and is wound around the supply spool, a press member, mounted to be coaxial with the supply spool and having a regulation portion for preventing radial spread of an outermost portion of the film, for substantially preventing the outermost portion of the film from being brought into contact with an inner wall of the film cartridge, a release portion for partially deforming the press member and continuously releasing the outermost portion of the film from radial regulation of the press member, and a guide portion for guiding a film portion released from the radial regulation to the film passing slit. The outermost portion of the film is set not to slip on the press member due to the spread of the outermost portion caused by loosening of the film upon rotation of the supply spool in the film feed direction. A driving force is applied in the film feed direction, thereby feeding the film from the film cartridge 401.

In a camera using this film cartridge 401, the film cartridge 401 can be loaded in a cartridge chamber 407 and subsequent film feeding can be performed by only opening/closing a cartridge lid 412 formed in the cartridge chamber 407 to be openable at a minimum size for loading the film cartridge 401 into the cartridge chamber 407, as shown in FIG. 31.

The camera of this embodiment also includes a finder 404, a photographing lens 405, and an electronic flash unit 406.

One end 413a of a leaf spring 413 is fixed in the cartridge chamber 407 with a screw B1. One end 414a of a leaf spring 414 is fixed in the cartridge chamber 407 with a screw B2. The leaf springs 413 and 414 urge the film cartridge 401 against reference surfaces 407a and 407b of the cartridge chamber 407 to position the film cartridge 401.

A cartridge lid lock lever 415 is pivotally mounted on a camera body at a shaft 415 thereof. One end of a spring 416 is fixed to the camera body, and the other end of the spring 416 is fixed to an arm portion 415b of the cartridge lid lock lever 415. The spring 416 biases the cartridge lid lock lever 415 counterclockwise, i.e., applies a biasing force thereto in a direction indicated by an arrow C in FIG. 32. A stopper 417 is mounted in the camera body to regulate counterclockwise rotation of the cartridge lid lock lever 415.

An engaging portion 415c of the cartridge lid lock lever 415 can be engaged with an engaging portion 412b of the cartridge lid 412. When the engaging portion 415c is engaged with the engaging portion 412b, the cartridge lid 412 is kept closed. In order to open the cartridge lid 412, the cartridge lid lock lever 415 is manually rotated clockwise against the biasing force of the spring 416 to disengage the engaging portion 412b from the engaging portion 415c.

Figure 33:
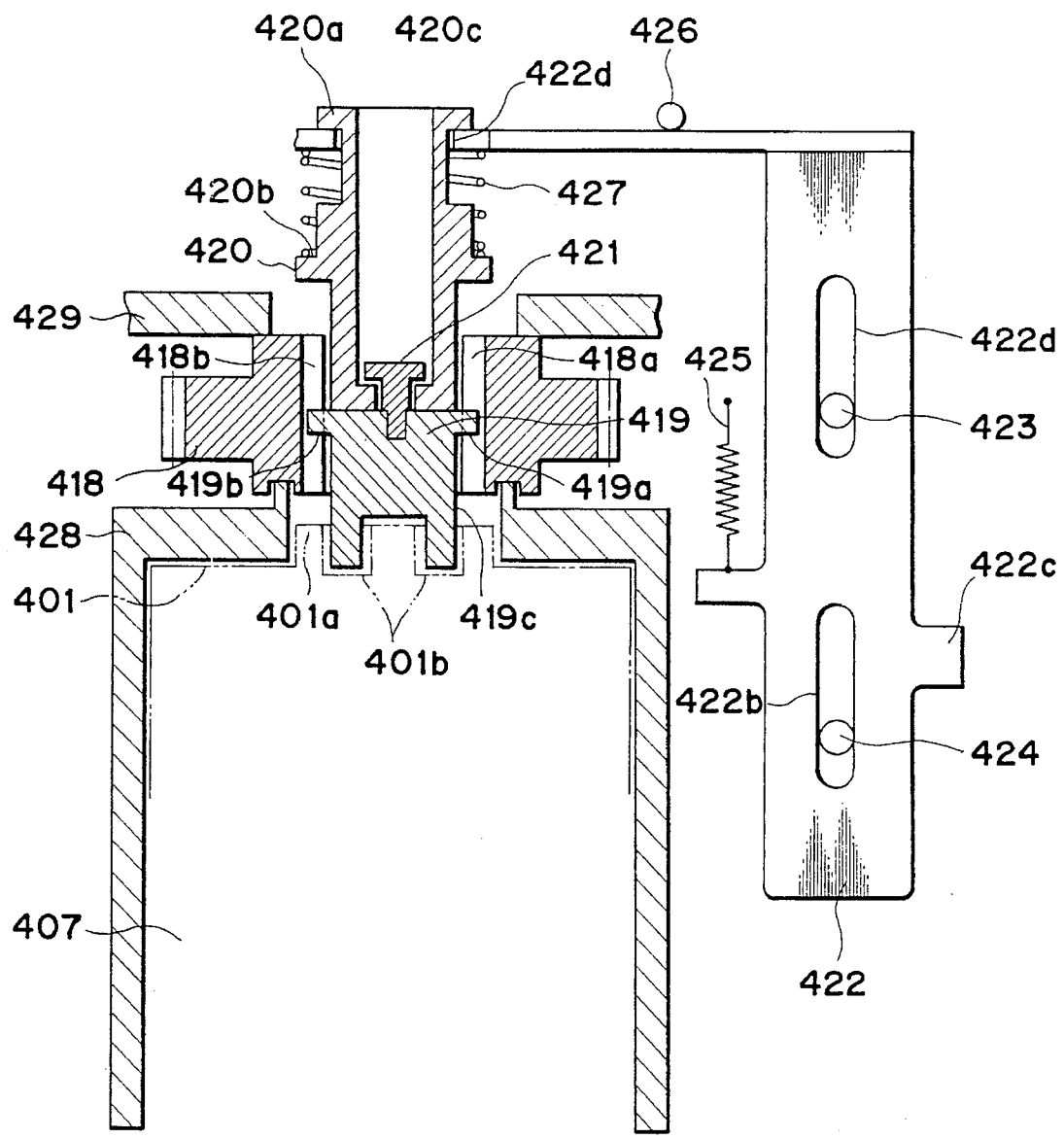
FIG. 33 is a sectional view showing the structure of a fork and its vicinity in the camera shown in FIG. 31.

FIG. 33 is a view showing the fork and its vicinity in detail.

Referring to FIG. 33, a fork gear 418 is meshed with a known film feed gear train and is driven thereby. The fork gear 418 is held rotatable by a camera body 428 and a base plate 429. A fork 419 is engaged with splines 401b of a supply spool 401a of the film cartridge 401 and drives the supply spool 401a. Projections 419a and 491b are formed on the fork 419. Since the projections 419a and 419b are respectively fitted in grooves 418a and 418b of the fork gear 418, the fork 419 can be rotated together with the fork gear 418. A shaft 419c of the fork 419 is fitted in the fork gear 418 and is vertically movable in FIG. 33.

A holding cylinder 420 is formed to be vertically movable together with the fork 419 by means of a stepped screw 421. The holding cylinder 420 is movable relative to the stepped screw 421 and the fork 419.

Figure 34:
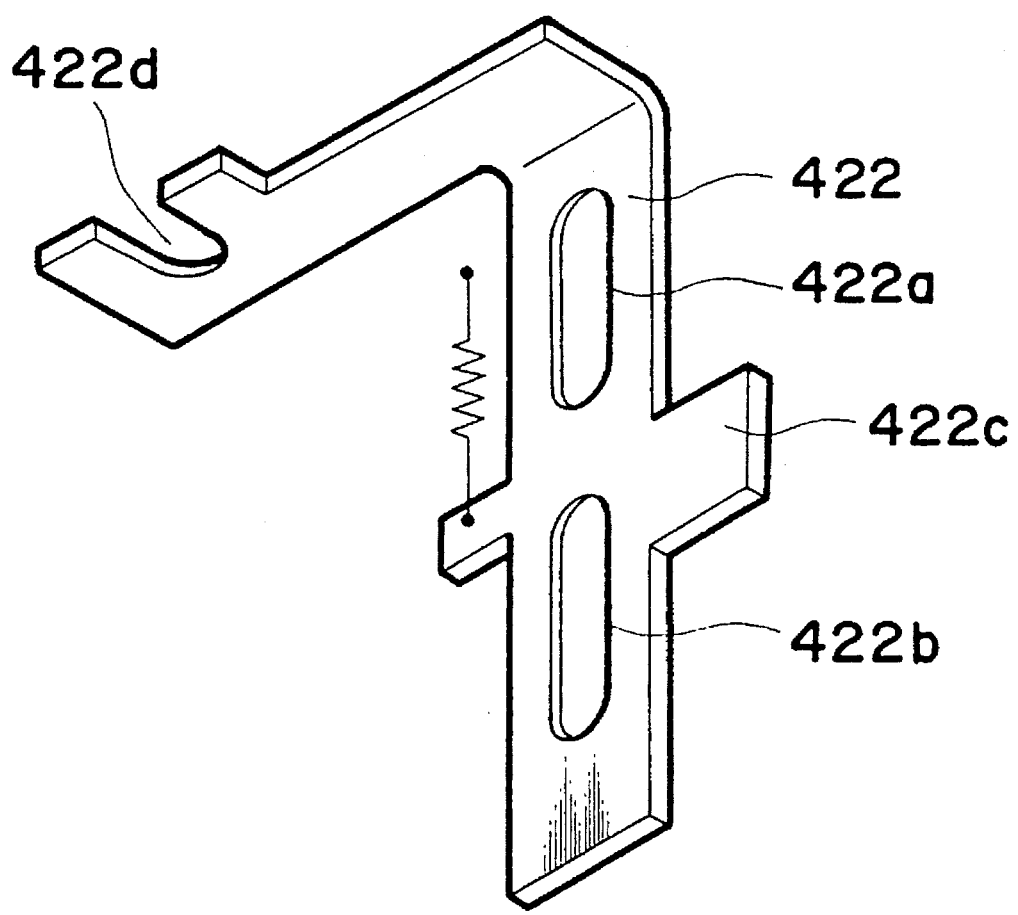
FIG. 34 is a perspective view showing an eject lever shown in FIG. 33 in detail.
Figure 35:
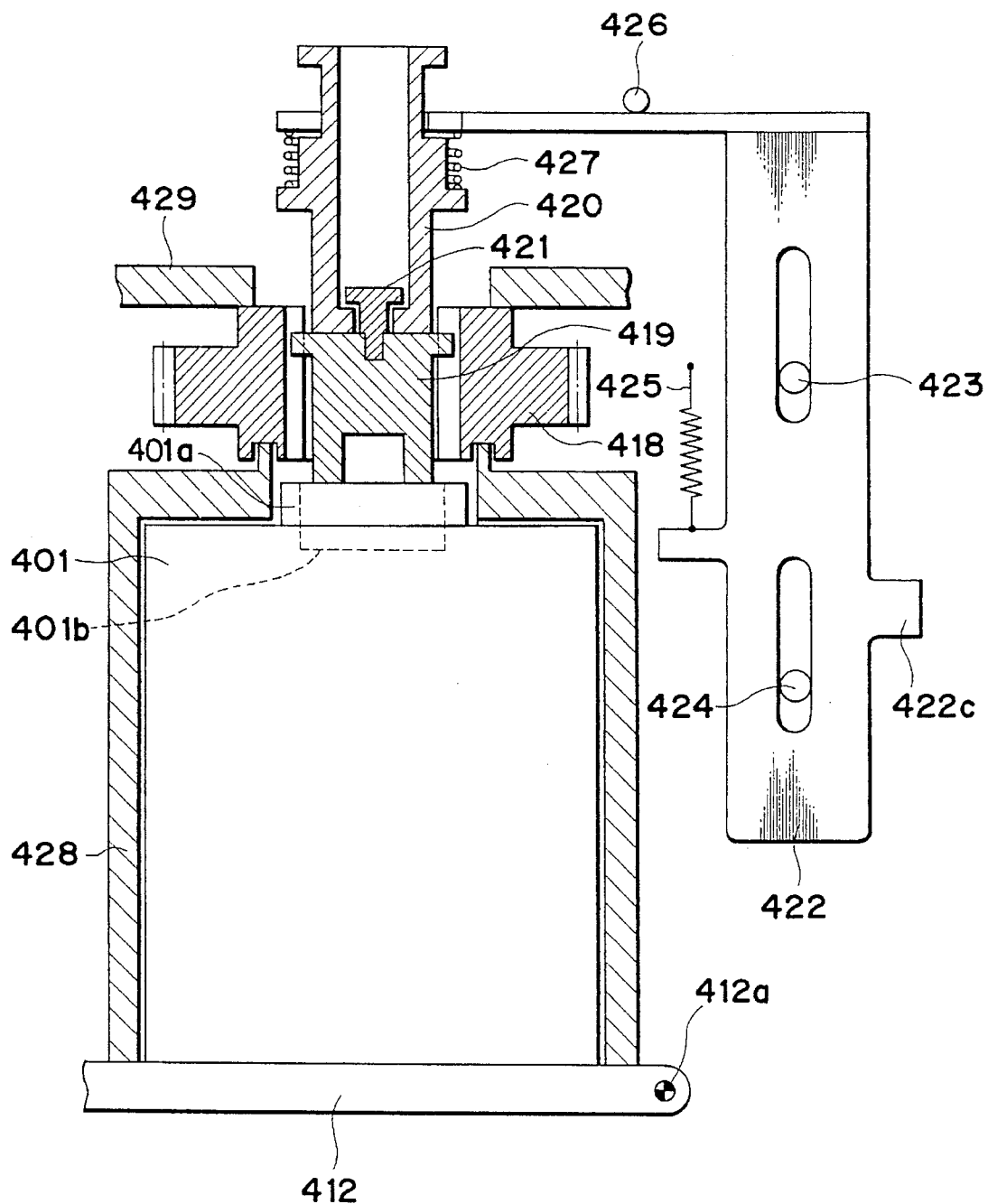
FIG. 35 is a sectional view showing a state in which a fork is kept disengaged from a supply spool when a film cartridge is loaded in a cartridge chamber of the camera shown in FIG. 31.

An ejector lever 422 is vertically movable such that projections 423 and 424 formed on a main body (not shown) are respectively fitted in elongated holes 422a and 422b of the ejector lever 422. An operation portion 422c is formed on the ejector lever 422. As shown in FIG. 31, the operation portion 422 is exposed from the camera cover and can be manually operated by a user. A groove 422d formed in the ejector lever 422 is fitted in a small-diameter portion 420c of the holding cylinder 420 to be rotatable and vertically movable. FIG. 34 shows the detailed structure of the ejector lever 422.

One end of a spring 425 is fixed to the camera body (not shown), and the other end of the spring 425 is fixed to the ejector lever 422. The spring 425 biases the ejector lever 422 upward. A stopper 426 is mounted on the camera body (not shown) to regulate the upper position of the ejector lever 422. A compression spring 427 is arranged between the ejector lever 422 and the holding cylinder 420 to separate them from each other. A collar 420a is formed on the holding cylinder 420, and the ejector lever 422 is not separated from the holding cylinder 420 by a distance exceeding a distance corresponding to the state shown in FIG. 33.

FIG. 33 shows the state before the film cartridge 401 is loaded, or the state in which the phase of the splines 401b of the supply spool 401a is matched with that of the fork 419. In this case, the fork 419 and the holding cylinder 420 are kept urged against the ejector lever 422 by the spring 427.

When the phase of the supply spool 401a of the fork 419 is not matched with that of the splines 401b during loading of the film cartridge 401, the fork 419 and the holding cylinder 420 are moved upward by the supply spool 401a against the biasing force of the spring 427. Therefore, the film cartridge 401 can be loaded in the cartridge chamber 407, and the cartridge lid can be closed.

When the fork gear 418 is rotated by a film feed gear train (not shown) in this state, the fork 419 is rotated together with the fork 418. When the phase of the fork 419 is matched with that of the splines 401b of the supply spool 401a, the fork 419 and the holding cylinder 420 are moved downward (FIG. 33) by the biasing force of the spring 427, and the fork 419 is engaged with the splines 401b. That is, the state shown in FIG. 33 is set.

After film feeding, photographing, and the like are performed, and the film in the film cartridge 401 is rewound, the film cartridge 401 is removed or ejected from the cartridge chamber 407 as follows.

After the cartridge lid 412 is opened in the state in FIG. 33, the operation portion 422c of the ejector lever 422 is operated and moved downward against the biasing force of the spring 425.

Figure 36:
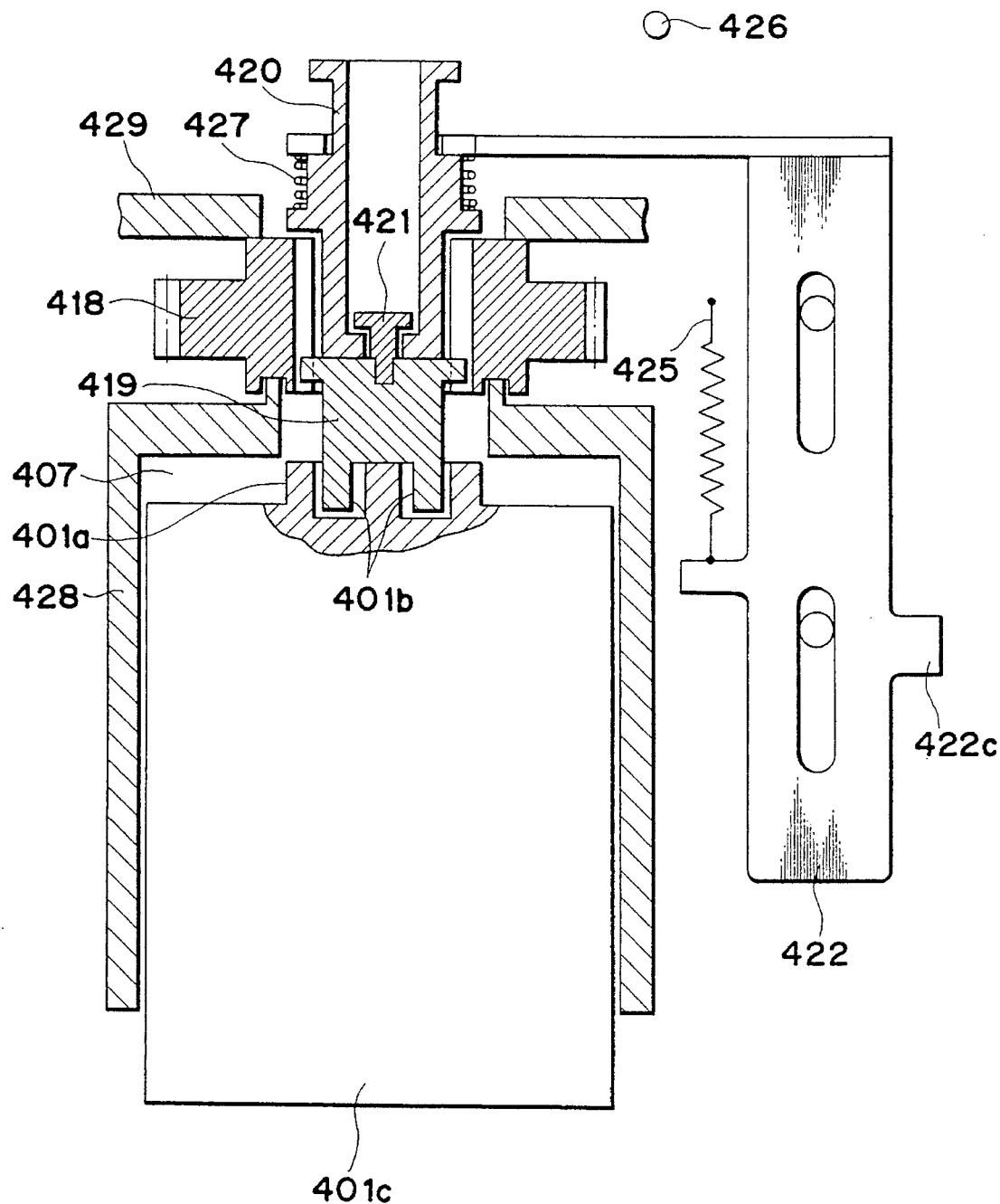
FIG. 36 is a sectional view showing a state in which the film cartridge is ejected or unloaded from the cartridge chamber of the camera shown in FIG. 31.

During downward movement of the ejector lever 422, the ejector lever 422 is brought into contact with a stepped portion 420b of the holding cylinder 420 to move the holding cylinder 420 and the fork 419 downward. The film cartridge 401 is pushed downward, as shown in FIG. 36, and a part (401c) of the film cartridge 401 appears from the cartridge chamber 407. In this state, the user can easily hold the exposed portion of the film cartridge 401 and can remove the film cartridge 401.

Since the film cartridge 401 is pushed through the fork 419 to eject the film cartridge 401, this mechanism can also be effectively applied to the following camera.

A film cartridge comprising an indicating means for indicating the use state of a film cartridge on a supply spool or a member interlocked with the supply spool, and a locking means displaceable between a position in which rotation of the supply spool is inhibited and a position where rotation of the supply spool is allowed is proposed by the present applicant in Japanese Patent Application No. 3-183948 or U.S. Ser. No. 834,640.

In the camera capable of axially loading the above film cartridge, it may be assumed that this locking means is disabled near the final stroke for loading the film cartridge into the cartridge chamber and is enabled during ejection of the film cartridge. During ejection of the film cartridge, rotation of the supply spool must be inhibited by the fork until the locking means is enabled. For this purpose, the fork must have a structure to follow axial ejection of the film cartridge. When such a structure is obtained by using a spring or the like, the fork may not follow axial ejection of the film cartridge because the constituent members may be caught. It is not confirmed whether the fork normally follows axial ejection of the film cartridge. In this embodiment, however, the fork is moved downward by the manual operation to eject the film cartridge. To confirm ejection of the film cartridge is to confirm that the fork has been normally moved downward. The above problem (the fork is not normally moved in the vertical direction or there is no method of confirming that the fork is not normally operated) can be solved.

Figure 37:
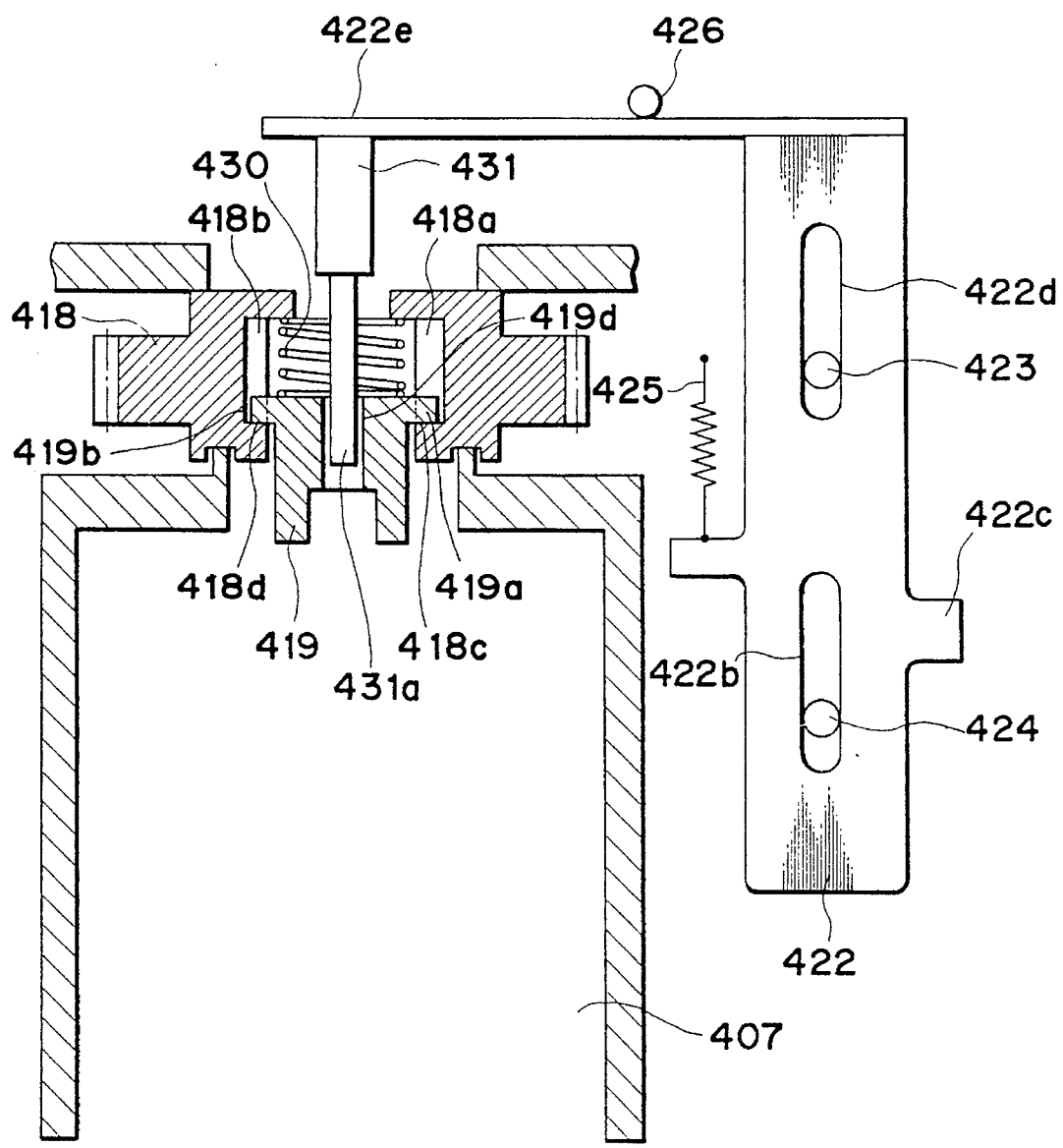
FIG. 37 is a perspective view showing a cartridge chamber and its vicinity in a camera according to the eleventh embodiment of the present invention.

FIG. 37 is a sectional view showing the structure of a fork and its vicinity in a camera according to the eleventh embodiment of the present invention. The same reference numerals as in the tenth embodiment denote the same parts and functions in the eleventh embodiments.

Referring to FIG. 37, a compression spring 430 is arranged between a fork gear 418 and a fork 419 to separate them from each other.

The fork 419 is positioned such that its projections 419a and 419b are respectively fitted in grooves 418c and 418d of the fork gear 418.

An ejector pin 431 is fixed to an arm portion 422e of an ejector lever 422. A distal end portion 431a of the ejector pin 431 passes through a through hole 419d of the fork 419 and can be brought into contact with a supply spool 401a of a film cartridge 401. When the ejector lever 422 is moved downward, the film cartridge 401 can be ejected from a cartridge chamber 407.

In the eleventh embodiment, the film cartridge 401 can be accurately ejected from the cartridge chamber 407 with a simpler structure than that in the tenth embodiment.

In each of the tenth and eleventh embodiments, a fork or a member concentric with the fork is axially moved to eject a film cartridge from a cartridge chamber. For this reason, an ejection force acts on the central portion of the film cartridge, and the film cartridge can be smoothly ejected without being inclined. Since the fork is manually moved, an unnecessary force is not accumulated inside the camera during loading of the film cartridge. Deformation of the camera can be prevented.

As described above, in each of the tenth and eleventh embodiments, an operation member for axially moving the fork and ejecting the cartridge from the cartridge chamber upon this axial movement is arranged.

The eject member which is concentric with the fork and can be brought into contact with the film cartridge loaded in the cartridge chamber, and an operation member, moved together with the eject member, for ejecting the film cartridge from the cartridge chamber through the eject member are arranged.

The fork engaged with the axial center of the film cartridge or the member disposed concentric with the fork is manually moved in the axial direction, i.e., the ejection force is manually applied to the center of axis of the film cartridge. Therefore, the film cartridge is ejected from the cartridge chamber.

The biasing force of a film cartridge ejection elastic member need not be applied as an unnecessary force during loading of the film because the film cartridge ejection elastic member is omitted. In addition, inclination of the film cartridge during its ejection can be prevented, so that the film cartridge can be smoothly ejected.

What is claimed is:

1. A camera comprising:

a cartridge chamber capable of axially loading a film cartridge;

push-out means for axially pushing the film cartridge to eject the film cartridge, said push-out means comprising a driving member for driving a supply spool of the film cartridge;

biasing means for applying a biasing force to said driving member to cause said driving member to urge the supply spool of the film cartridge; and inhibiting means for inhibiting the biasing force of said biasing means at least during film feeding.

2. A camera according to claim 1, wherein said driving member is located substantially on an axis of the film cartridge to engage with an engaging portion of the supply spool, said driving member applying a force to the supply spool at the engaging portion in an axial direction of the film cartridge, thereby axially pushing out the film cartridge from said film cartridge chamber.

3. A cartridge loading apparatus for a camera, said cartridge loading apparatus comprising:

a cartridge chamber capable of axially loading a film cartridge;

push-out means for axially pushing the film cartridge to eject the film cartridge, said push-out means comprising a driving member for driving a supply spool of the film cartridge;

biasing means for applying a biasing force to said driving member to cause said driving member to urge the supply spool of the film cartridge; and inhibiting means for inhibiting the biasing force of said biasing means at least during film feeding.

4. A cartridge loading apparatus according to claim 3, wherein said driving member is located substantially on an axis of the film cartridge to engage with an engaging portion of the supply spool, said driving member applying a force to the supply spool at the engaging portion in the axial direction of the film cartridge, thereby pushing out the film cartridge from said film cartridge chamber.

5. A cartridge loading apparatus, comprising:

a cartridge chamber capable of axially loading a film cartridge;

push-out means for axially pushing the film cartridge to eject the film cartridge, said push-out means comprising a driving member for driving a supply spool of the film cartridge;

biasing means for applying a biasing force to said driving member to cause said driving member to urge the supply spool of the film cartridge; and inhibiting means for inhibiting the biasing force of said biasing means at least during film feeding.

6. A cartridge loading apparatus according to claim 5, wherein said driving member is located substantially on an axis of the film cartridge to engage with an engaging portion of the supply spool, said driving member applying a force to the supply spool at the engaging portion in the axial direction of the film cartridge, thereby pushing out the film cartridge from said film cartridge chamber.

* * * * *

UNITED STATES PATENT AND TRADEMARK OFFICE
CERTIFICATE OF CORRECTION

PATENT NO. : 5,563,673
DATED : October 8, 1996
INVENTOR(S) : CHIKARA AOSHIMA

It is certified that error appears in the above-indentified patent and that said Letters Patent is hereby corrected as shown below:

COLUMN 8

Line 23, "an" should read --and--.

COLUMN 10

Line 60, "according" should read --according to--.

COLUMN 13

Line 47, "an" should read --a--.

Signed and Sealed this

Twenty-fifth Day of February, 1997

Attest:

BRUCE LEHMAN

*Attesting Officer*  *Commissioner of Patents and Trademarks*